(12) United States Patent
Miyamoto et al.

(10) Patent No.: US 8,817,328 B2
(45) Date of Patent: Aug. 26, 2014

(54) IMAGE PROCESSING APPARATUS, IMAGE PROCESSING METHOD, AND IMAGE PROCESSING PROGRAM

(75) Inventors: Isao Miyamoto, Kanagawa (JP); Hiroyuki Kawamoto, Kanagawa (JP); Hiroshi Arai, Saitama (JP); Satoshi Ohkawa, Tokyo (JP); Takeharu Tone, Kanagawa (JP); Naoki Sugiyama, Kanagawa (JP); Taira Nishita, Tokyo (JP); Maki Ohyama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/301,202

(22) Filed: Nov. 21, 2011

(65) Prior Publication Data

US 2012/0062918 A1    Mar. 15, 2012

Related U.S. Application Data

(63) Continuation of application No. 12/722,294, filed on Mar. 11, 2010, now Pat. No. 8,081,344, which is a continuation of application No. 11/384,512, filed on Mar. 21, 2006, now Pat. No. 7,710,599.

(30) Foreign Application Priority Data

Mar. 22, 2005   (JP) ................................. 2005-082343

(51) Int. Cl.
  *G06F 3/12*        (2006.01)
(52) U.S. Cl.
  USPC ........... 358/1.9; 358/1.2; 358/1.13; 358/1.16; 358/448

(58) Field of Classification Search
  USPC ........ 358/1.2, 1.9, 1.13, 1.15, 1.16, 448, 501; 348/207.99, 207.1
  See application file for complete search history.

(56) References Cited

U.S. PATENT DOCUMENTS

| 6,281,992 | B1 | 8/2001 | Kondo | |
|---|---|---|---|---|
| 6,519,048 | B1 * | 2/2003 | Tanaka | 358/1.13 |
| 6,791,702 | B2 * | 9/2004 | Tanaka | 358/1.13 |
| 6,940,541 | B1 | 9/2005 | Small | |

(Continued)

FOREIGN PATENT DOCUMENTS

| JP | 6-59951 | 3/1994 |
|---|---|---|
| JP | 7-20976 | 1/1995 |

(Continued)

OTHER PUBLICATIONS

U.S. Appl. No. 13/301,202, filed Nov. 21, 2011, Miyamoto, et al.

(Continued)

*Primary Examiner* — Kimberly A Williams
(74) *Attorney, Agent, or Firm* — Oblon, Spivak, McClelland, Maier & Neustadt, L.L.P.

(57) ABSTRACT

An image processing apparatus implements appropriate image processing on image data stored in a storage unit of the image processing apparatus easily and efficiently, and distributes the image data to an external apparatus. An image format conversion unit implements image processing such as resolution conversion processing, filter processing, γ correction processing, and halftone processing on image data stored in an HDD serving as an image data storage unit so that the image data conform to conditions, such as image quality and format, specified by an external client apparatus. The image-processed image data are then distributed to the external client apparatus.

20 Claims, 34 Drawing Sheets

(56) References Cited

U.S. PATENT DOCUMENTS

| | | |
|---|---|---|
| 7,284,069 B2 | 10/2007 | Buckley et al. |
| 7,672,004 B2 * | 3/2010 | Ohyama et al. ............ 358/1.15 |
| 7,710,599 B2 | 5/2010 | Miyamoto et al. |
| 8,081,344 B2 * | 12/2011 | Miyamoto et al. ............ 358/1.9 |
| 2002/0156923 A1 | 10/2002 | Tanimoto |
| 2002/0196456 A1 | 12/2002 | Komiya et al. |
| 2003/0067621 A1 * | 4/2003 | Tanaka ....................... 358/1.13 |
| 2003/0123075 A1 | 7/2003 | Lin et al. |
| 2003/0135649 A1 | 7/2003 | Buckley et al. |
| 2003/0227637 A1 | 12/2003 | Tanaka |
| 2004/0114172 A1 | 6/2004 | Ohyama et al. |
| 2004/0131263 A1 | 7/2004 | Kawamoto et al. |
| 2004/0160614 A1 | 8/2004 | Komiya et al. |
| 2004/0234140 A1 * | 11/2004 | Nonaka ....................... 382/232 |
| 2004/0240727 A1 * | 12/2004 | Larson ....................... 382/162 |
| 2004/0263890 A1 | 12/2004 | Kawamoto et al. |
| 2005/0003859 A1 * | 1/2005 | Morisaki et al. ............ 455/557 |
| 2005/0081137 A1 * | 4/2005 | Ferlitsch ....................... 715/500 |
| 2005/0093981 A1 * | 5/2005 | Nonaka ....................... 348/207.99 |
| 2005/0134903 A1 * | 6/2005 | Tanimoto et al. ............ 358/1.15 |
| 2005/0157322 A1 * | 7/2005 | Kizaki et al. ................ 358/1.13 |
| 2005/0185000 A1 * | 8/2005 | Nonaka ....................... 345/590 |
| 2005/0190265 A1 | 9/2005 | Small |
| 2005/0213120 A1 | 9/2005 | Ohkawa et al. |
| 2005/0243375 A1 * | 11/2005 | Ohyama et al. ............ 358/2.1 |
| 2005/0259279 A1 * | 11/2005 | Ohyama et al. ............ 358/1.9 |
| 2006/0215205 A1 | 9/2006 | Ohyama et al. |
| 2007/0263253 A1 | 11/2007 | Kamiyama et al. |
| 2008/0165371 A1 | 7/2008 | Tanaka |
| 2009/0027713 A1 * | 1/2009 | Takano et al. ............ 358/1.13 |

FOREIGN PATENT DOCUMENTS

| | | |
|---|---|---|
| JP | 2733464 | 12/1997 |
| JP | 11-122496 | 4/1999 |
| JP | 2000-333026 | 11/2000 |
| JP | 2001-150744 | 6/2001 |
| JP | 2001-268366 | 9/2001 |
| JP | 2002-132642 | 5/2002 |
| JP | 2003-264706 | 9/2003 |
| JP | 2003-283713 | 10/2003 |

OTHER PUBLICATIONS

Japanese Office Action issued Nov. 8, 2011, in Patent Application No. 2010-85935.

* cited by examiner

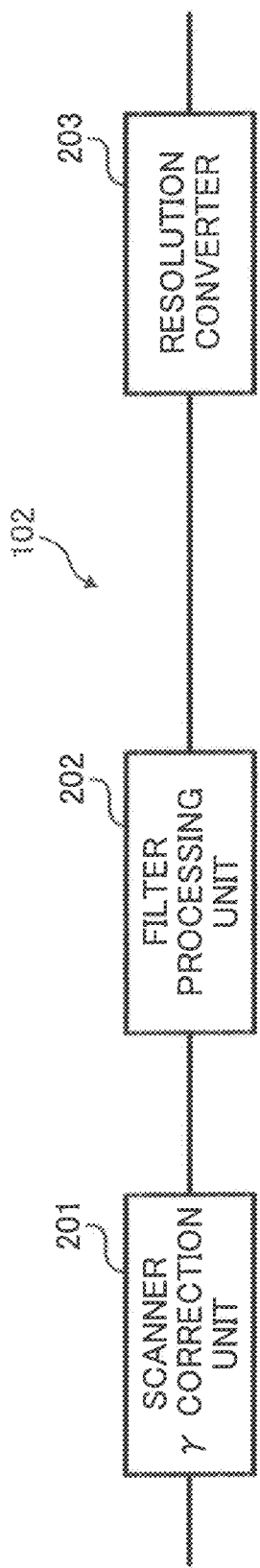
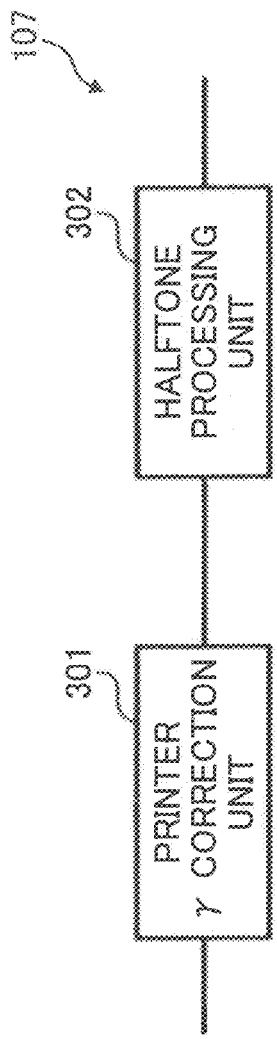

FIG. 8

| DATA FORMAT | COMPRESSION FORMAT | RESOLUTION |
|---|---|---|
| COPY | MULTI-VALUE FIXED LENGTH COMPRESSION | 600dpi |
| PRINTER | BINARY REVERSIBLE VARIABLE LENGTH COMPRESSION | 300,600,1200dpi |
| FAX | BINARY REVERSIBLE VARIABLE LENGTH COMPRESSION | 200,300,400dpi |
| SCANNER | MULTI-VALUE FIXED LENGTH COMPRESSED IMAGE DATA | 600dpi |

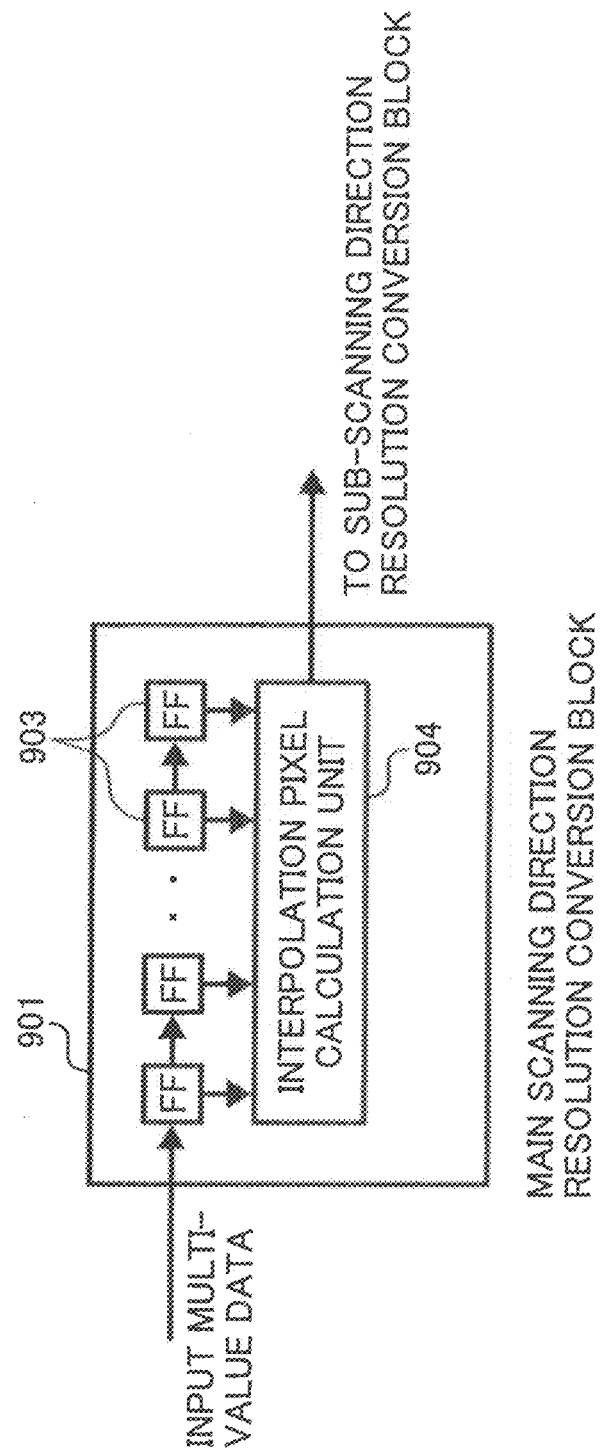

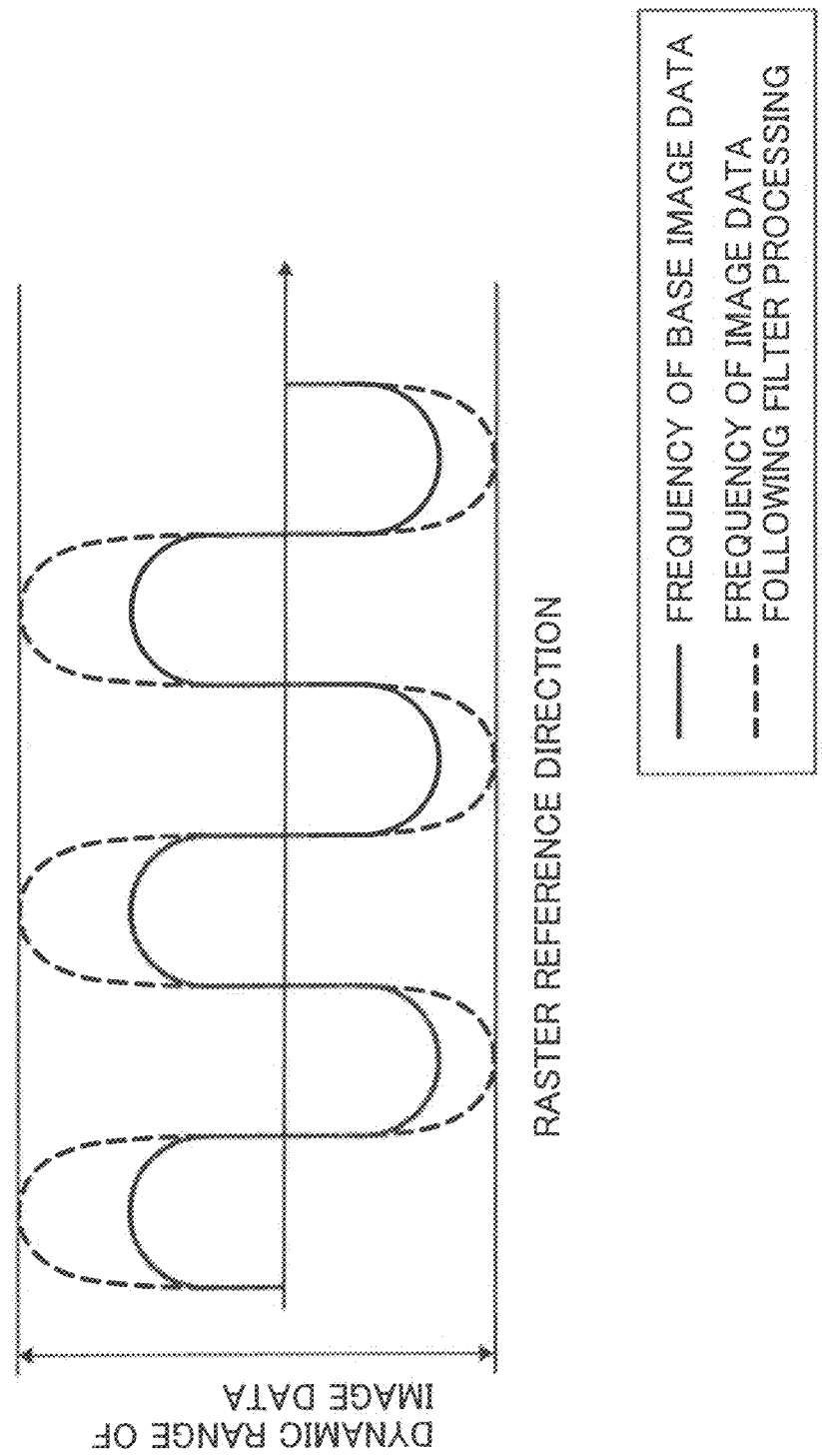

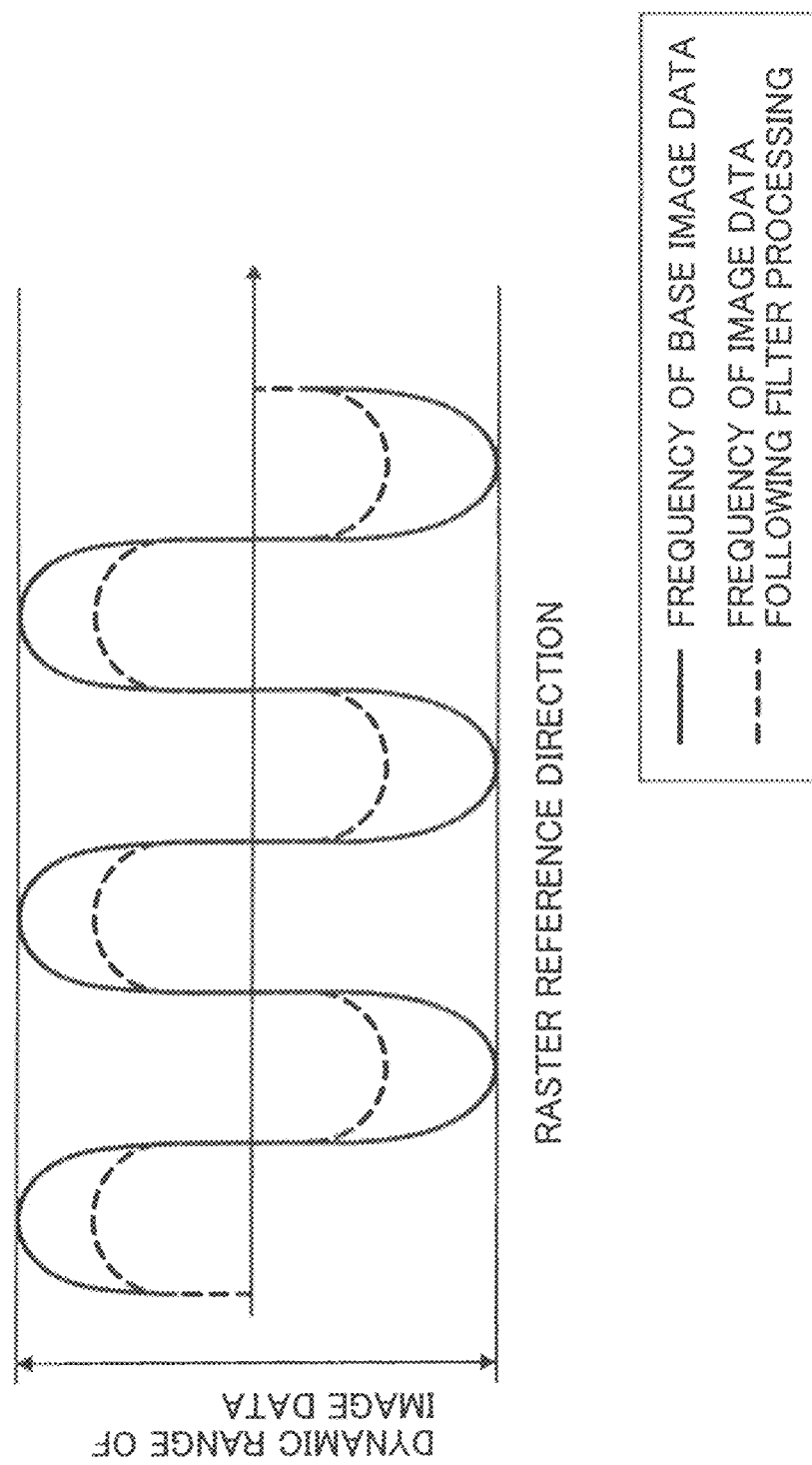

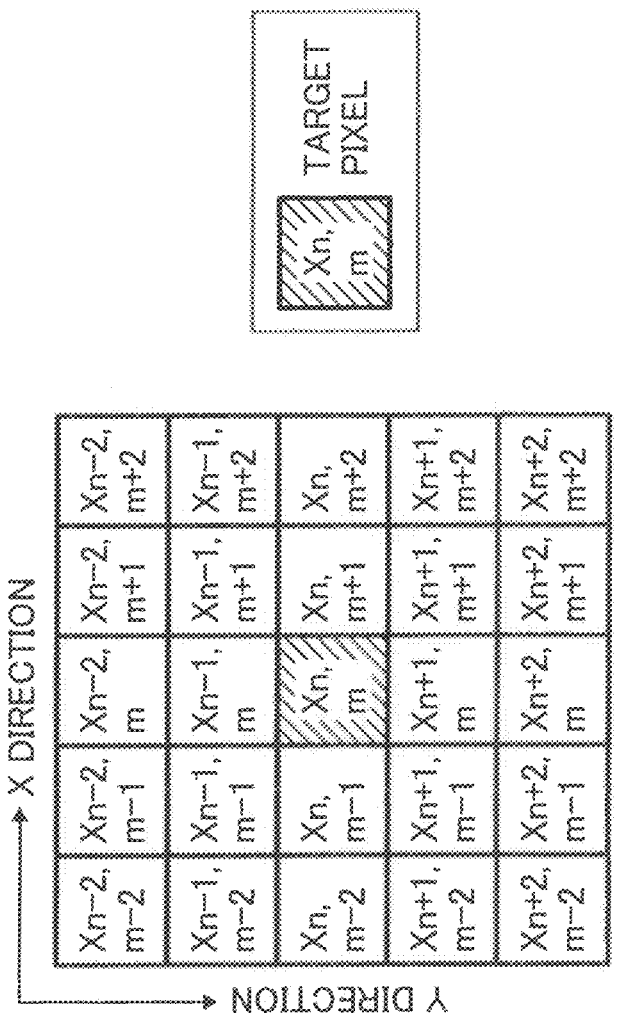

FIG. 30

| d00 | d01 | d02 | d03 | d04 |
|-----|-----|-----|-----|-----|
| d10 | d11 | d12 | d13 | d14 |
| d20 | d21 | d22 | d23 | d24 |
| d30 | d31 | d32 | d33 | d34 |
| d40 | d41 | d42 | d43 | d44 |

IMAGE PROCESSING APPARATUS, IMAGE PROCESSING METHOD, AND IMAGE PROCESSING PROGRAM

CROSS-REFERENCE TO RELATED APPLICATIONS

The present continuation application claims the benefit of priority under 35 U.S.C. 120 to application Ser. No. 12/722,294, filed Mar. 11, 2010, which is a continuation of U.S. application Ser. No. 11/384,512, filed Mar. 21, 2006 and claims priority under 35 U.S.C. 119 to Japanese Application No. 2005-082343 filed Mar. 22, 2005, the entire contents of application Ser. No. 12/722,294, application Ser. No. 11/384,512, and Japanese Application No. 2005-082343 are incorporated herein by reference.

BACKGROUND OF THE INVENTION

1. Field of the Invention

The present invention relates to an image processing apparatus, an image processing method, and an image processing program for distributing image data accumulated by a digital copier, facsimile apparatus, scanner, or the like to an external apparatus.

2. Description of the Background Art

Japanese Unexamined Patent Application Publication 2000-333026, Japanese Unexamined Patent Application Publication 2001-150744, and so on, for example, disclose a so-called network scanner technique for connecting a digital copier or image reading apparatus to a network, scanning an original image using a scanner of the digital copier or image reading apparatus, and distributing the read image data to another terminal connected to the network such as a computer.

A copying technique is also known for connecting a digital copier or image reading apparatus to a network, scanning an original image using a scanner of the digital copier or image reading apparatus, printing the read image data from a printer unit, and outputting the image on a sheet of paper.

However, in this conventional network scanner technique, image data subjected to image processing by an image processing unit of an image processing apparatus are compressed in order to increase the transfer speed at which the image data are distributed to an external client apparatus by the digital copier or other apparatus. If the image data are compressed in a format from which they can be expanded by the external client apparatus which receives the image data, no problem occurs, but when the image data are distributed to a plurality of external client apparatuses, the data must be re-scanned so that they can be compressed in a format enabling expansion by each of the plurality of external client apparatuses.

Meanwhile, in the conventional copying technique, the image processing performed by the image processing unit is performed according to a specific method for each company. As a result, the image data are set in a specific printing format, and are therefore unsuitable for distribution to an external client apparatus as in the network scanner technique described above. Even if the image data were distributed to an external client apparatus, the image data would remain in a specific format for printing output, and could not therefore be viewed, edited, or otherwise processed on the external client apparatus.

SUMMARY OF THE INVENTION

An object of the present invention is to solve the problems in the prior art described above by providing an image processing apparatus, an image processing method, and an image processing program for generating image data in a universal format that can be used in common by various image processing apparatuses from a read original image and distributing these image data to an external apparatus, thereby providing universal and shared image data.

In accordance with the present invention, an image processing apparatus can be connected to a client apparatus via a network and comprises an mage reading device for reading an original image and generating a predetermined image signal; an image processing device for implementing predetermined image processing on the image signal generated by the image reading device; a storage device for storing image data subjected to the image processing by the image processing device; an image format converting device for converting the image data stored in the storage device into a format which conforms to attributes of image data handled by the client apparatus; and a transmitting device for transmitting the image data subjected to format conversion by the image format converting means to the client apparatus.

In accordance with an image processing method of the present invention, image processing is performed by an image processing apparatus that can be connected to a client apparatus via a network. The method comprises an image reading step of reading an original image and generating a predetermined image signal; an image processing step of implementing predetermined image processing on the image signal generated in the image reading step; a storage step of storing image data subjected to the image processing in the image processing step; an image format converting step of converting the image data stored in the storage step into a format which conforms to attributes of image data handled by said client apparatus; and a transmitting step of transmitting the image data subjected to format conversion in the image format converting step to the client apparatus.

In accordance with an image processing program of the present invention causes a computer to execute an image processing method in which image processing is performed by an image processing apparatus that can be connected to a client apparatus via a network. The image processing method comprises an image reading step of reading an original image and generating a predetermined image signal; an image processing step of implementing predetermined image processing on the image signal generated in the image reading step; a storage step of storing image data subjected to the image processing in the image processing step; an image format converting step of converting the image data stored in the storage step into a format which conforms to attributes of image data handled by the client apparatus; and a transmitting step of transmitting the image data subjected to format conversion in the image format converting step to the client apparatus.

BRIEF DESCRIPTION OF THE DRAWINGS

The above and other objects, features, and advantages of the present invention will become more apparent from the following detailed description taken with the accompanying drawings in which:

FIG. 6 is a block diagram showing the constitution of a scanner correction unit in the system;

FIG. 7 is a block diagram showing the constitution of a printer correction unit in the system;

FIG. 8 is a table showing relationships between the compression format and the resolution of image data stored on a hard disk of the system;

FIGS. 14A to 14C are views showing the constitution of a resolution converter of the image format conversion unit;

FIGS. 15A to 15C are views illustrating filter processing;

FIG. 30 is a view illustrating a matrix used in isolated point removal processing;

DESCRIPTION OF THE PREFERRED EMBODIMENTS

Before describing the present invention, the prior art of the present invention and problems associated therewith will be described with reference to the drawings.

Figure 1:
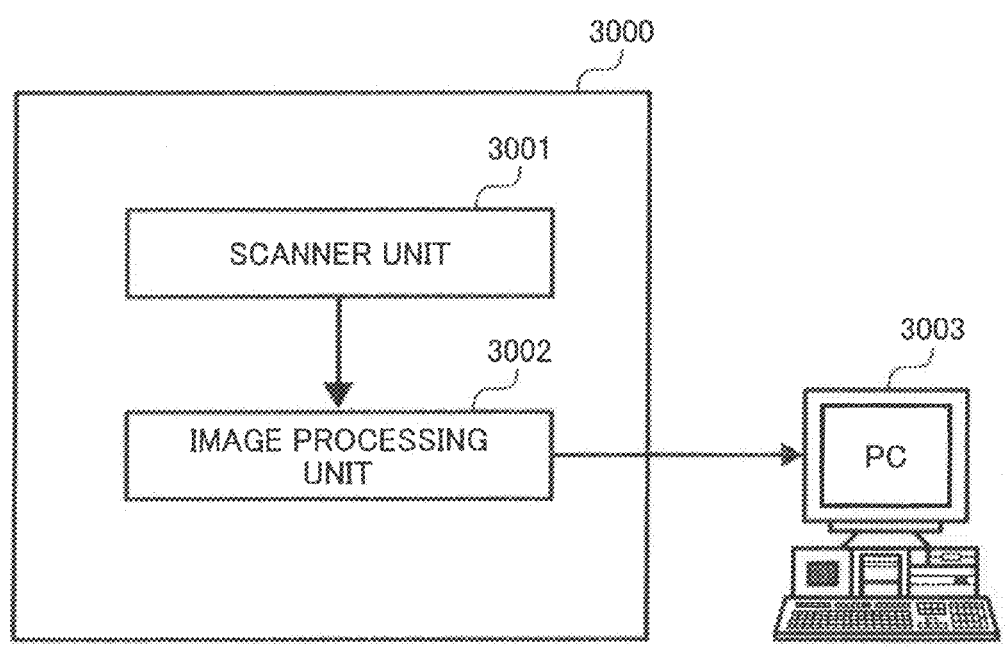
FIG. 1 is a block diagram showing the constitution of an image processing apparatus using a typical conventional network scanner technique.

First, referring to FIG. 1, a typical conventional network scanner technique will be described. As shown in the drawing, a conventional network scanner technique is performed using an image processing apparatus 3000 and a PC (Personal Computer) 3003. The image processing apparatus 3000 is constituted by a scanner unit 3001 and an image processing unit 3002. In this conventional network scanner technique, an original image is scanned by the scanner unit 3001, and the read image is transferred to the image processing unit 3002 as image data represented in the RGB (Red Green Blue) color space, for example. The image processing unit 3002 then implements predetermined image processing on the received image data. Printing output of the image data is not planned as a part of the image processing in this case, and hence there is no need to generate printing image data for a printing output system. For example, the image processing comprises image data compression and so on for increasing the transfer speed during transmission to the PC 3003, and conversion into a universal format such as JPEG (Joint Photographic Experts Group) that can be displayed on the PC 3003. The image processing unit 3002 transmits the image-processed image data to the PC 3003, which is connected to the image processing unit 3002 by a LAN (Local Area Network) or the like. The PC 3003 can then view or edit the received image data.

Figure 2:
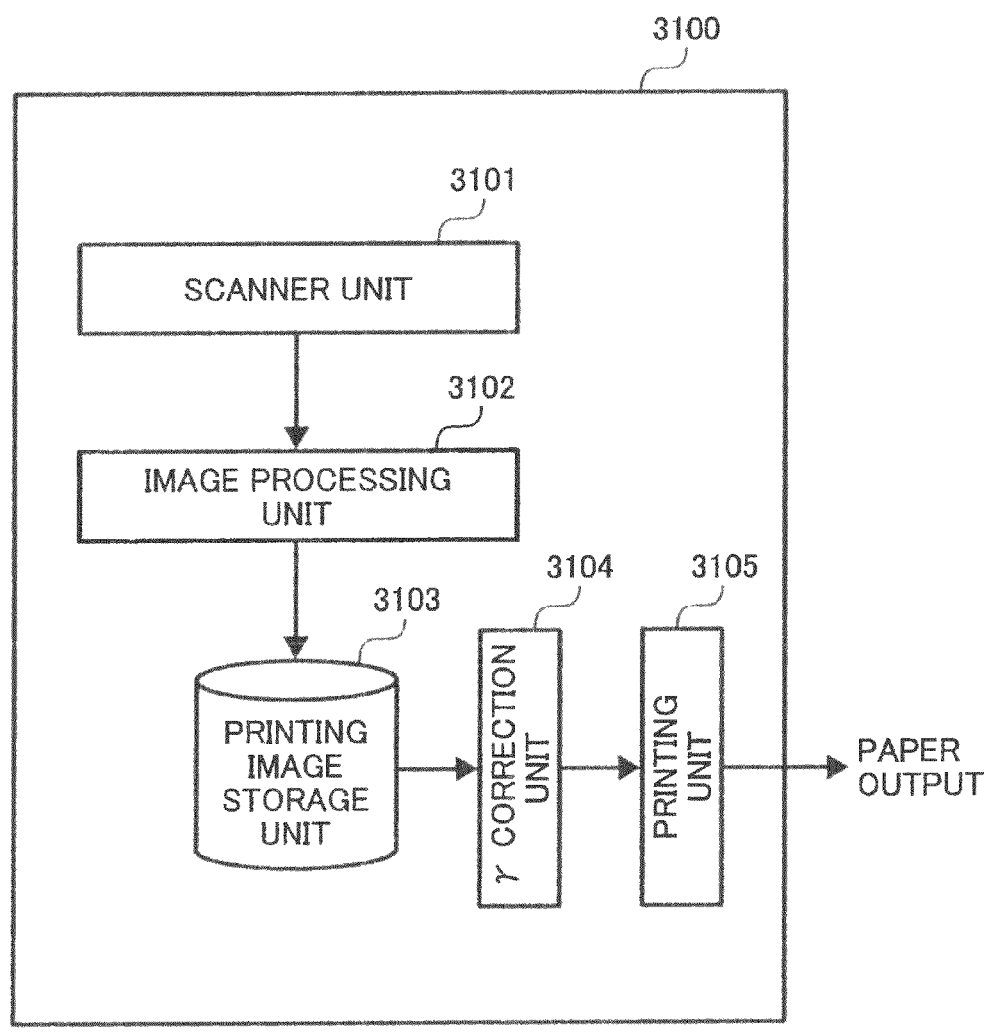
FIG. 2 is a block diagram showing the constitution of an image processing apparatus using a typical conventional capturing technique.

Next, referring to FIG. 2, the constitution of a typical conventional copying technique will be described. As shown in the drawing, in a conventional copying technique, an image processing apparatus 3100 performs printing and paper output. The image processing apparatus 3100 is constituted by a scanner unit 3101, an image processing unit 3102, a printing image storage unit 3103, a γ correction unit 3104, and a printer unit 3105. In this conventional copying technique, an original image is scanned by the scanner unit 3101 and the read image is transferred to the image processing unit 3102 as image data represented in RGB, for example. The image processing unit 3102 then implements predetermined image processing on the received image data. Printing output is planned as a part of the image processing, and therefore the image processing unit 3102 performs color space conversion from the RGB system to the CMYK (Cyan Magenta Yellow Black) system to generate printing image data for a printing output system. Furthermore, since printing output is planned, compression processing is performed to an extent which allows easy expansion processing such that the original image data can be reproduced, and since transmission to an external PC or the like is not planned, processing for this purpose is not performed. Next, the image processing unit 3102 transfers the printing image data converted into the CMYK system to the printing image storage unit 3103, and the printing image storage unit 3103 transfers the printing image data to the γ correction unit 3104. The γ correction unit 3104 implements γ correction for a printer on the received printing image data, and then transmits the image data to the printer unit 3105. The printer unit 3105 prints the received printing image data and outputs the image on a sheet of paper.

However, these conventional network scanner and copying techniques contain unsolved problems such as those described above.

An image processing apparatus and an image processing method according to the present invention will now be described in outline with reference to the attached drawings. In the following, an example will be described in which read image data are subjected to predetermined image processing, then converted into a universal format that can be used in common by various image processing apparatuses such as PCs and printers, or subjected to compression processing, and then transmitted.

Figure 3:
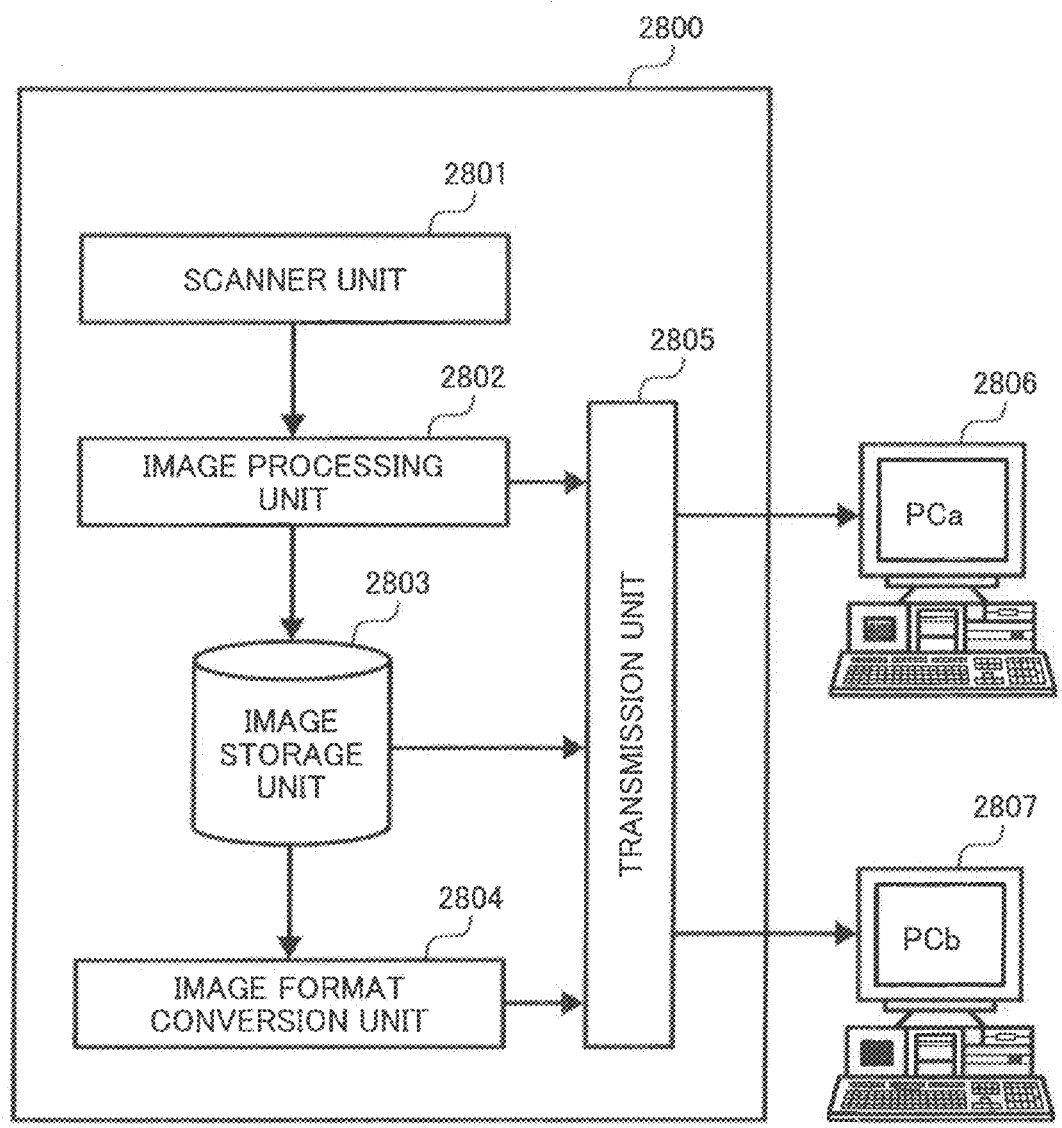
FIG. 3 is a block diagram showing the constitution of an image processing apparatus using a network scanner technique according to the present invention.

FIG. 3 shows the constitution of an image processing apparatus using a network scanner technique according to the present invention.

As shown in the drawing, an image processing apparatus 2800 according to the present invention comprises a scanner unit 2801, an image processing unit 2802, an image storage unit 2803, an image format conversion unit 2804, and a transmission unit 2805. A PCa 2806 and a PCb 2807 are connected to the image processing apparatus 2800.

An original image is set on the scanner unit 2801 and scanning is executed on the basis of scanning parameters such as the format, resolution, gradation, and image size of the image data, which are set using an operating unit not shown in the drawing. The scanner unit 2801 then outputs the scanned image to the image processing unit 2802 as image data represented in the RGB color space, for example.

The image processing unit 2802 implements predetermined image processing on the received image data. Here, the image processing involves compression processing or the like for facilitating storage and management, which is constituted by conversion into a universal image format such as JPEG, for example. Processing such as photograph/character mode selection, resolution limitation, conversion of the magnification and so on, and γ correction is also performed. The image processing unit 2802 then outputs the image data converted into the JPEG format to the transmission unit 2805. The transmission unit 2805 transmits the image data to the PCa 2806 which is capable of displaying JPEG format image data.

In addition, the image processing unit 2802 outputs the image data converted into the JPEG format to the image storage unit 2803. The image processing unit 2802 outputs the image data converted into the JPEG format to the image storage unit 2803, and the image storage unit 2803 stores the received image data. The transmission unit 2805 is capable of reading the JPEG format image data stored in the image storage unit 2803 and transmitting the image data to the PCa 2806 or the PCb 2807, both of which are capable of displaying JPEG format image data. Thus the PCa 2806 and PCb 2807 are both capable of sharing the image data stored in the image storage unit 2803 of the image processing apparatus 2800.

In certain cases, the PCb 2807 does not comprise an application capable of processing JPEG format image data, and in such cases, another image format is required. Hence, the image storage unit 2803 transfers the stored JPEG format image data to the image format conversion unit 2804, and the image format conversion unit 2804 converts the image data into an image format conforming to the image data attributes that can be handled by the PCb 2807. For example, the image data attributes include a universal image format that can be processed by an application provided in the PCb 2807. Examples of the image formats into which the JPEG format image data may be converted include a TIFF (Tagged File Format) format and a GIF (Graphics Interchange Format) format.

The image format conversion unit 2804 then transfers the converted image data to the transmission unit 2805, and the transmission unit 2805 transmits the image data to the PCb 2807 on which they can be displayed. Here, the image formats that can be displayed by the PCb 2807 may be set in advance, or the image format conversion unit 2804 may convert the image format in response to a request from the PCa 2806 or the PCb 2807.

A user may then view, edit, or store the image data received by the PCb 2807 using an application provided in the PCb 2807 which corresponds to the converted format of the image data.

Figure 4:
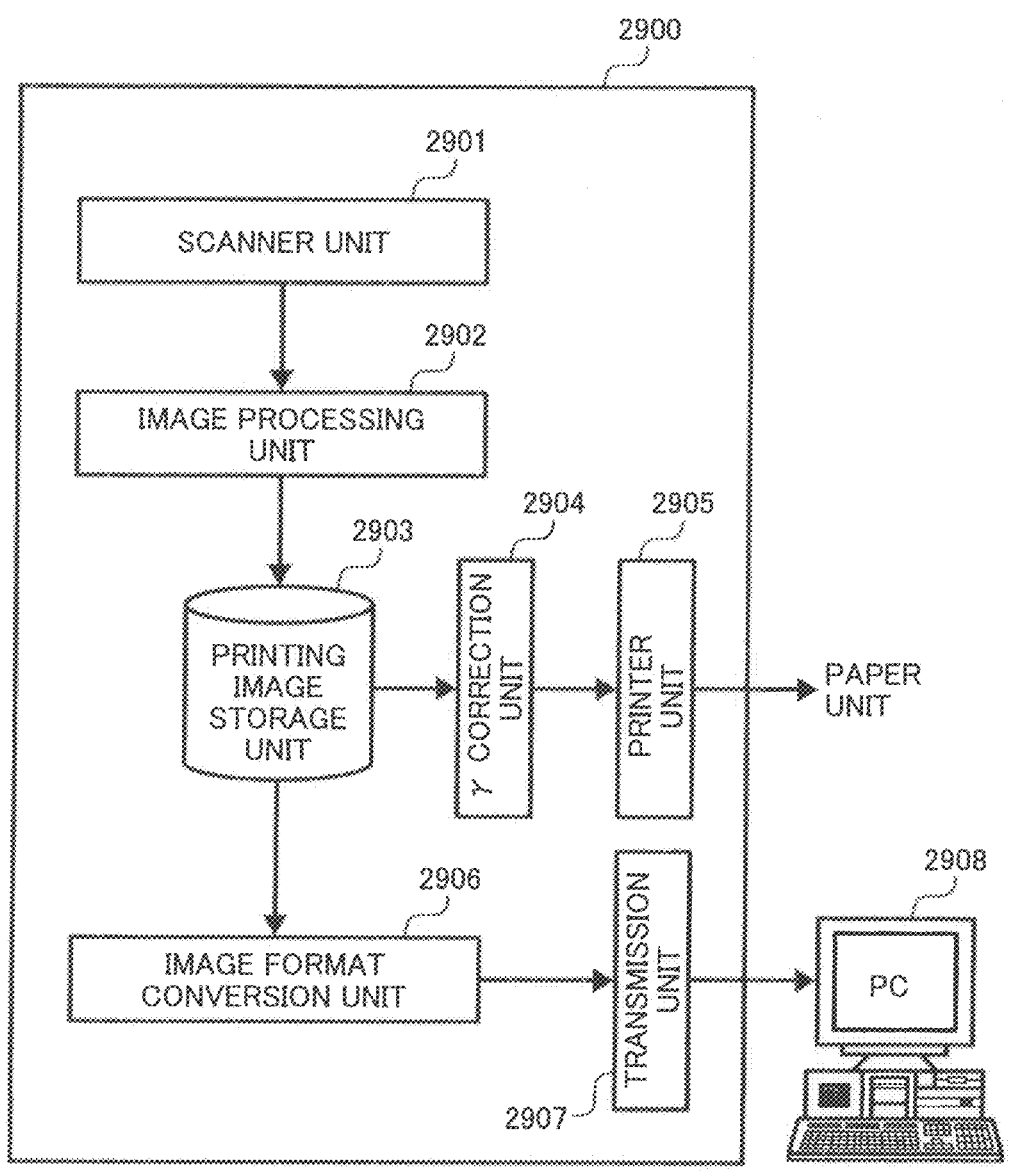
FIG. 4 is a block diagram showing the constitution of an image processing apparatus using a capturing technique according to the present invention.

Next, an image processing system relating to a capturing technique in which printing output is planned will be described. FIG. 4 shows the constitution of an image processing apparatus using a capturing technique according to the present invention.

As shown in the drawing, an image processing apparatus 2900 according to the present invention comprises a scanner unit 2901, an image processing unit 2902, a printing image storage unit 2903, a γ correction unit 2904, a printer unit 2905, an image format conversion unit 2906, and a transmission unit 2907. A PC 2908 is connected to the image processing apparatus 2900.

An original image is set on the scanner unit 2901 and scanning is executed on the basis of scanning parameters such as the resolution, gradation, and image size, which are set using an operating unit not shown in the drawing. The scanner unit 2901 then outputs the scanned image to the image processing unit 2902 as image data represented in the RGB color space, for example.

The image processing unit 2902 implements predetermined image processing on the received image data. Here, the image processing is processing with a view to printing, and therefore resolution limitation and magnification conversion are not performed. Instead, color space conversion from the RGB system to the CMYK system is performed to generate printing image data for a printing output system. Processing such as photograph/character mode selection, gradation correction, and compression processing is also performed. Note that since printing output is planned, the compression processing is only performed to an extent which allows easy expansion processing such that the original image data can be reproduced. The image processing unit 2902 then stores the printing image data converted into the CMYK system in the printing image storage unit 2903, whereupon the printing image storage unit 2903 transfers the printing image data to the γ correction unit 2904. The γ correction unit 2904 implements γ correction for a printer on the received printing image data and then transmits the image data to the printer unit 2905. The printer unit 2905 prints the received printing image data and outputs the image on a sheet of paper.

In addition, the printing image storage unit 2903 outputs the printing image data converted into the CMYK system to the image format conversion unit 2906. The image format conversion unit 2906 converts the image data into an image format conforming to the image data attributes that can be handled by the PC 2908. For example, the image data attributes include the image data volume and image data type, and accordingly, the image format conversion unit 2906 converts the image data to a universal image format that can be processed by an application provided in the PC 2908. Examples of universal image formats include a JPEG format, a TIFF format, and a GIF format. The image processing unit 2902 may also perform processing for the purpose of transmission rather than printing, and hence data compression may be performed to reduce the volume of the image data if necessary. The image processing unit 2902 may also perform processing to convert the image data from color to monochrome. Furthermore, the CMYK system printing image data may be converted into RGB system image data. Following this processing, the image format conversion unit 2906 transfers the converted image data to the transmission unit 2907, and the transmission unit 2907 transmits the image data to the PC 2908.

The image formats that can be processed by the PC 2908 may be set in advance using a setting unit not shown in the drawing, or the image format conversion unit 2906 may convert the image format in response to a request from the PC 2908.

Note that in the outline of the image processing apparatus and image processing method described above, the network scanner technique and the capturing technique were described as separate functions in FIGS. 3 and 4, but the image processing apparatus may comprise both functions.

According to the outline described above, in the network scanner technique, image data can be subjected to format conversion and transmitted in response to a request by a user of a connected PC, and hence the image data can be shared among a plurality of PCs.

Further, in the above capturing technique according to the present invention, image data can be converted into a universal format corresponding to the ability of a PC by the image format conversion unit. Image processing and transmitting means are also provided for transmitting the image data to a PC, and hence the image data can be viewed and edited easily using the PC.

Next, preferred embodiments of the image processing apparatus, image processing method, and image processing program according to the present invention will be described in detail with reference to the attached drawings.

First Embodiment

Figure 5:
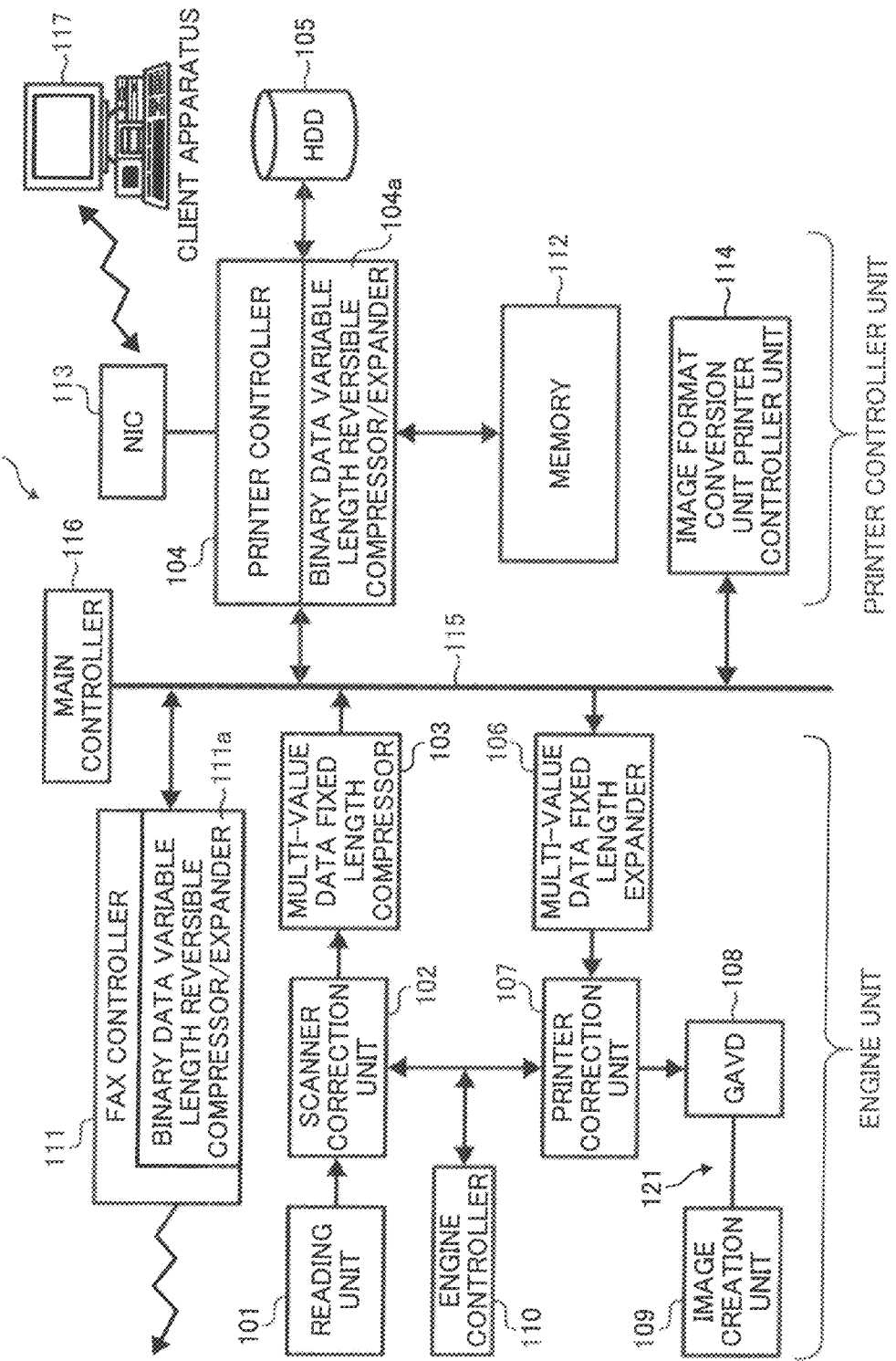
FIG. 5 is a block diagram showing the overall constitution of an image processing system according to a first embodiment of the present invention.

FIG. 5 shows the overall constitution of an image processing system according to a first embodiment. As shown in the drawing, this image processing system is constituted by an image processing apparatus 100, and an external client apparatus 117 which is connected to the image processing apparatus 100 via a network. The image processing apparatus 100 is assumed to be a so-called digital complex machine comprising a facsimile (FAX) function, a printer function, and a function for distributing an input image (a read original image or an image that is input using the printer function or FAX function).

As elements used in a copying function, the image processing apparatus 100 comprises a reading unit 101 for reading an original as color image data, a scanner correction unit 102 for implementing predetermined image processing on the image data that are read by the reading unit 101, a multi-value data fixed length compressor 103 for compressing the multi-value data output from the scanner correction unit 102, and an HDD (Hard Disk Drive) 105 for storing the compressed data.

As an element used in the FAX function, the image processing apparatus 100 comprises a FAX controller 111 which is connected to a PSTN in order to transmit and receive FAX signals and comprises a binary data variable length reversible expander 111a for returning received compressed FAX data to the original data.

As elements used in the printer function, the image processing apparatus 100 comprises an NIC (Network Interface Controller) 113 for performing communication with the network-connected external client apparatus 117, and a printer controller 104 for performing raster image processing (RIP) in accordance with a print command received from the external client apparatus 117 via the NIC 113, and performing data-specific compression following the RIP.

As an element used in the image data distribution function, the image processing apparatus 100 comprises an image format conversion unit 114 (to be described in detail hereafter) for converting data generated during use of the respective functions described above and stored in the HDD 105 into a data format that conforms to a user terminal at the transfer destination (the client apparatus 117).

When printing output (image formation processing) is performed on the image data generated using the functions described above, the data stored in the HDD 105 are used. To return the stored compressed data to the original data, a multi-value data fixed length expander 106 is provided in relation to the copying function, and a binary data variable length reversible expander 104a is provided in the printer controller 104 in relation to the FAX and printer functions. Further, an engine unit 121 constituted by a printer correction unit 107 for implementing correction on the expanded data, a GAVD 108, and an image creation unit 109 is provided as means for performing the image formation processing. Note that the scanner correction unit 102 and the engine unit 121 constituted by the printer correction unit 107 and so on are controlled by an engine controller 110.

The entire image processing apparatus 100 is controlled by a main controller 116.

Next, an operation of the functions of the image processing apparatus 100 constituted by the above elements will be described in more detail.

First, processing performing during use of the copying function will be described. When reading an original, the original is set on an original table and read by the reading unit 101, whereupon data separated into R, G, B colors are transmitted to the scanner correction unit 102. FIG. 6 shows the constitution of the scanner correction unit 102. In the scanner correction unit 102, scanner γ correction processing, filter processing, and resolution conversion processing are performed by a scanner γ correction unit 201, a filter processing unit 202, and a resolution converter 203, respectively. Following resolution conversion, the image data are compressed by the multi-value data fixed length compressor 103 and thus converted into 1 bit image data.

The image data compressed by the multi-value data fixed length compressor 103 are transmitted to the printer controller 104 via a universal bus 115. The printer controller 104 comprises an image data semiconductor memory 112, and the transmitted data are stored here. The resolution of the scanned image in the first embodiment is 600 dpi, and therefore the stored resolution during copying is 600 dpi.

The stored image data are written to the HDD 105 as needed. This is performed to avoid the need to re-read the original if a paper blockage occurs during printout or printing is not completed correctly, and also for the purpose of electronic sorting. In recent years, an additional function is provided for storing the read original so that the original can be output again as needed.

When printing output is to be performed, the compressed image data in the HDD 105 are first expanded to the semiconductor memory 112, and then transmitted to the engine portion 121 via the universal bus 115. The image data are then converted back into expanded image data by the multi-value data fixed length expander 106 of the engine unit 121. Next, the expanded data are transmitted to the printer correction unit 107. FIG. 7 shows the constitution of the printer correction unit 107. In the printer correction unit 107, printer γ correction processing is performed on the input image data by a printer γ correction unit 301. Next, halftone processing corresponding to the GAVD 108 and image creation unit 109 is performed by a halftone processing unit 302. The image data are then transmitted to a subsequent stage as data for use in image creation and output onto transfer paper.

The printer function is also activated upon reception of a print request from the external client apparatus 117, which is connected via the NIC 113. Pre-existing means may be applied to an operation of the printer controller 104 and hence detailed description thereof has been omitted. In this case, however, 1 bit RIP image data used as drawing data in the semiconductor memory 112 are generated in accordance with the print request from the external client apparatus 117. The image data subjected to raster image processing (RIP) are compressed sequentially by a specific compressor (the binary data variable length reversible compressor/expander 104a) of the printer controller 104. Following RIP, the data size is large, and hence data compression is performed to prevent excessive memory consumption when the data are stored in the semiconductor memory 112. The compressed image data are stored thus in the HDD 105. Note that the resolutions during a printer operation are 300 dpi, 600 dpi, 1200 dpi, and so on.

The FAX function is activated when the FAX controller 111 receives a FAX. Pre-existing means may be applied to an operation of the FAX controller 111 and hence detailed description thereof has been omitted. In this case, however, the received compressed FAX signal is returned to the original data by the binary data variable length reversible compressor/expander 111*a*, and thus an RIP image used as drawing data in the engine unit 121 is generated. At this time, the RIP image data are stored in the HDD 105, but since the data size is large following RIP, a great deal of memory is consumed when the data are stored in the semiconductor memory 112 without undergoing compression. Therefore, compression is performed and the compressed data are stored in the HDD 105. This compression processing is performed by the specific binary data variable length reversible compressor/expander 104*a* provided in the printer controller 104, similarly to the compression processing performed during use of the printer function. Note that the resolutions during a FAX operation are 200 dpi, 300 dpi, 400 dpi, and so on.

During a scanner operation, image data compressed by the binary data variable length reversible compressor/expander 104*a* of the printer controller 104, or image data not subjected to compression processing, are stored in the HDD 105. The stored image data may also be binarized image data that have been subjected to halftone processing or multi-value image data. The scanner reading resolution in the copying of the first embodiment is 600 dpi, and therefore the resolution of the stored image data during scanning is 600 dpi.

As described above, data having various resolutions and compressed in various formats exist in the HDD 105 of the image processing apparatus 100. FIG. 8 shows a summary of the compression formats and resolutions of the image data in the HDD 105.

In the image processing system of the first embodiment, a system is employed whereby an input image is stored temporarily in the HDD 105, whereupon the stored data are extracted from the HDD 105 for use. Hence, when image data are distributed to the outside of the image processing apparatus 100, the data stored in the HDD 105 are distributed.

As described above, various types of image data are stored in the HDD 105, and each type has a specific format. Hence, when the image data are transferred to an external apparatus as is, they may be in a format that is not suitable for the user side. It is therefore necessary to prevent such inconvenience on the user side by converting the image data into a data format that can be applied to the user terminal at the distribution destination. Hence, as a principle of the first embodiment, the image data stored in the HDD 105 are converted by the image format conversion unit 114 from a data format which is specific to apparatus characteristics into a universal data format which is not dependent on apparatus characteristics. Furthermore, in the image processing system, the type and format of the image data obtained by the client apparatus 117 are specified.

Figure 9:
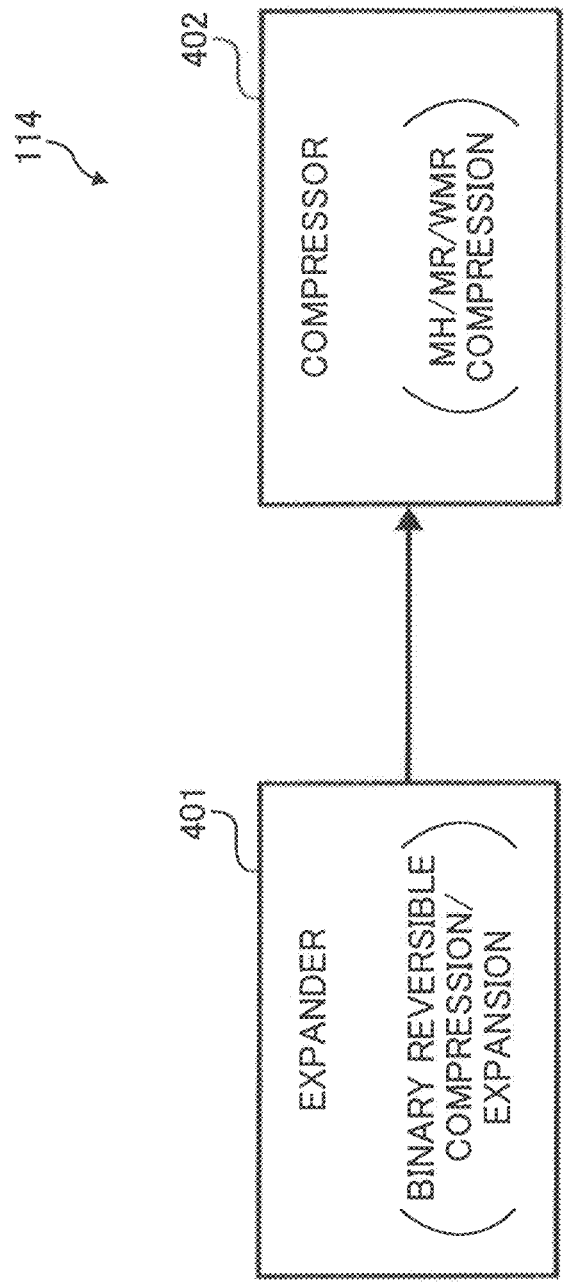
FIG. 9 is a block diagram showing a constitutional example of an image format conversion unit in the system.

The constitution of the image format conversion unit 114 will now be described. FIG. 9 shows an example of the constitution of the image format conversion unit 114. FIG. 9 shows a constitution which is capable of responding to a case in which the client apparatus 117 requests image data converted into universal binary compressed data when the image data are stored in the HDD 105 in a binary reversible compressed format specific to a printer machine. First, as shown in FIG. 9, the apparatus-specific binary reversible compressed data downloaded from the HDD 105 are expanded/converted by an expander 401, whereupon the data are compressed by a compressor 402 using an MH/MR/MMR method, which is a universal binary reversible compression method. A predetermined TIFF format header is then attached to the data, whereupon the data are distributed to the external client apparatus 117.

Figure 10:
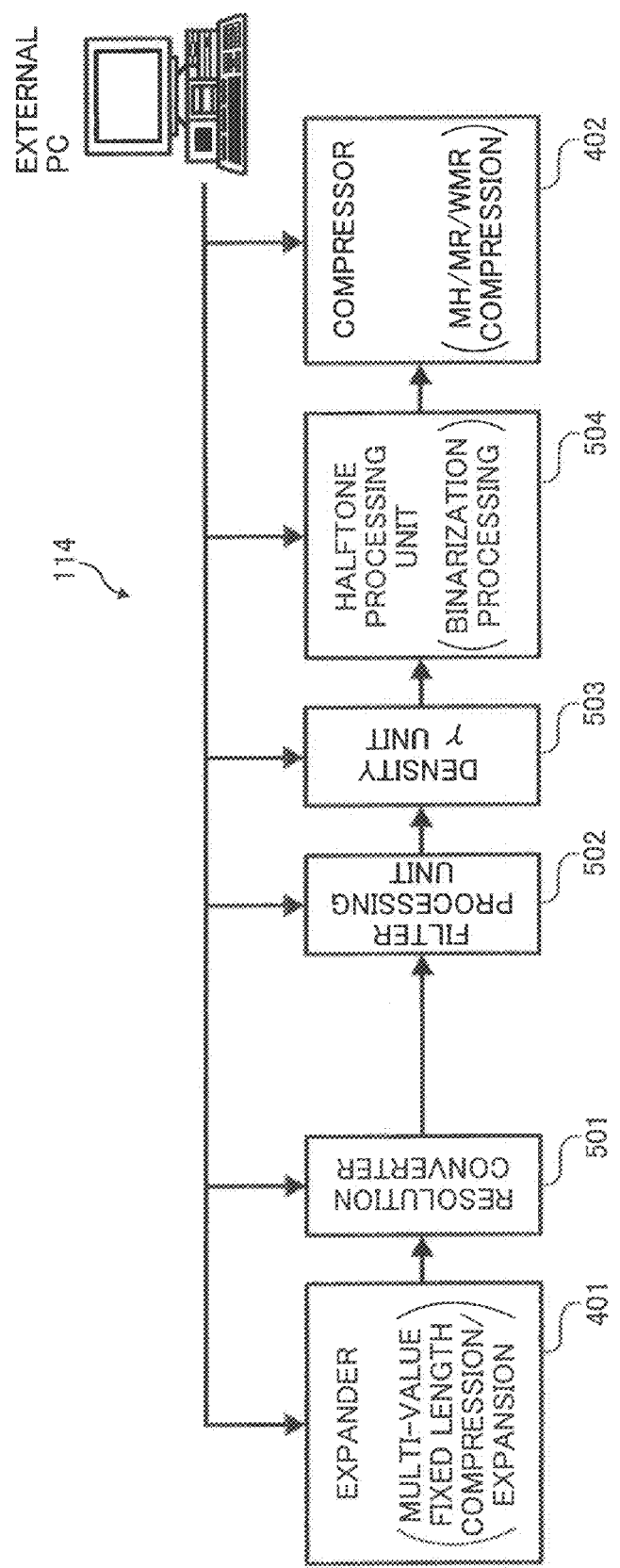
FIG. 10 is a block diagram showing another constitutional example of the image format conversion unit.

FIG. 10 shows another constitutional example of the image format conversion unit 114. FIG. 10 shows a constitutional example which is capable of responding to a case in which the external client apparatus 117 requests copying image data stored in the HDD 105 in the form of ½ resolution binary image data. As shown in FIG. 10, the copying compressed image data downloaded from the HDD 105 are expanded by the expander 401. Next, the expanded image data are subjected to resolution conversion by a resolution converter 501. When the resolution of the copying image data stored in the HDD 105 is 600 dpi, for example, the data are converted to a resolution of 300 dpi, i.e. half the original resolution, by the resolution converter 501. Next, the resolution-converted image data are subjected to emphasis filter processing of a predetermined intensity by a filter processing unit 502. The filter-processed image data are then subjected in succession to density γ conversion processing by a density γ unit 503 and binarization processing, such as error diffusion or the like, by a halftone processing unit 504. Finally, binary image data compression is performed by the compressor 402 using a G3 compression method. Following this image processing, the image data are distributed to the external client apparatus 117 via the NIC 113.

The type of image data to be obtained, for example the resolution, the type of filter processing, the type of γ conversion, the type of halftone processing, the universal compression method and whether or not universal compression is performed, the output format, and so on, may be specified from the client apparatus 117. By means of this specification, appropriate image processing can be implemented on the various image data stored in the HDD 105 and thus the image data can be distributed to the client apparatus 117.

In the image processing system, supplemental information other than the image data can also be distributed. Communication regarding the image quality of the image data requested by the client apparatus 117 side is performed in a universal format such as an XML language. All of the image processing parameters are described in this communication information, and the image format conversion unit 114 processes and distributes the image data in accordance with these parameters.

Further, in the image format conversion unit 114, a storage source application attached to the image data stored in the HDD 105 is detected, the image data of the application (typically known as a scanner application) to be distributed to the client apparatus 117 are selected, and predetermined image processing corresponding to a request from the client apparatus 117 is performed. The predetermined image processing includes resolution conversion, filter processing, γ conversion processing, and halftone processing.

Next, a more specific constitutional example of the image format conversion unit 114 will be described.

Figure 11:
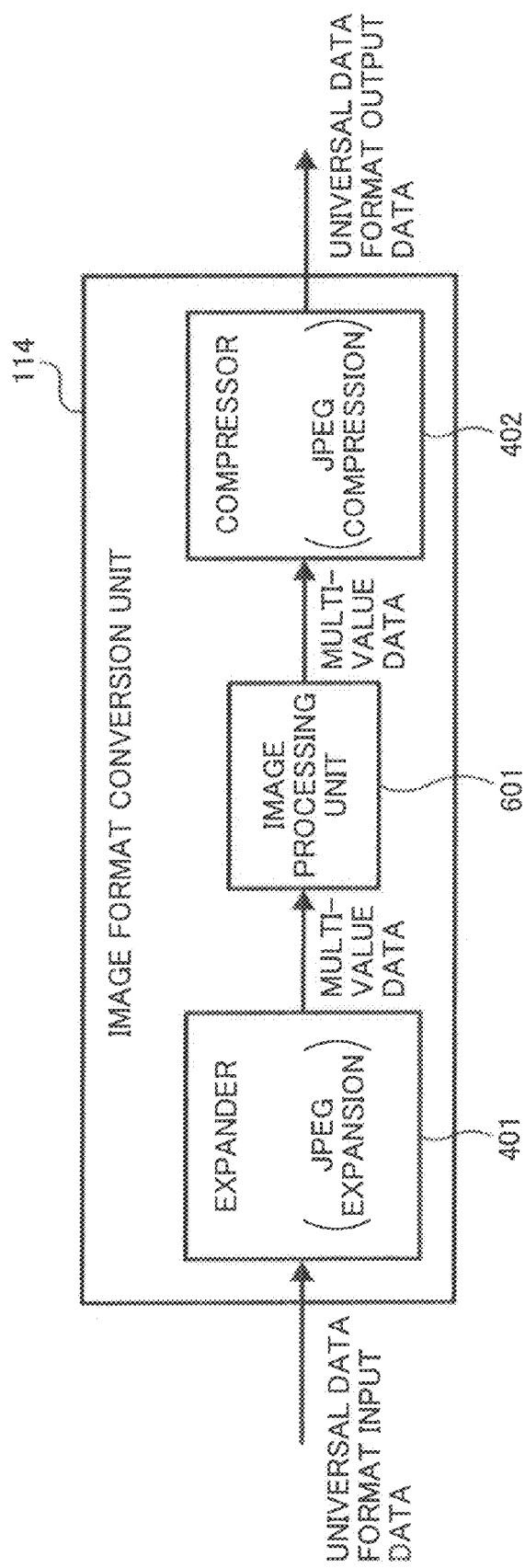
FIGS. 11 to 13 are views illustrating examples of data formatting performed by the image format conversion unit.

FIG. 11 shows an example in which the image data input into the image format conversion unit 114 are multi-value data that have been compressed into a universal data format using a multi-value data compression method. The image data output by the image format conversion unit 114 are multi-value data that have been compressed into a universal data format using a multi-value compression method. In other words, the expander 401 and compressor 402 perform expansion and compression in a universal data format. Note that in FIG. 11, an image processing unit 601 is constituted by the aforementioned resolution converter 501, filter processing unit 502, density γ unit 503, halftone processing unit 504, and so on (likewise in FIGS. 12 and 13 to be described below).

Image data compressed into a JPEG format and input into the image format conversion unit 114 are expanded by the expander 401 and thus returned to multi-value data. The data are then subjected to image processing by the image processing unit 601. When the image data are to be output back to the outside, JPEG compression is performed by the compressor 402, whereupon the image data are output in a universal data format.

In this example, JPEG is used as the format of the universal image format conversion unit 114, but any universal data format that can be used in general by a PC or the like, such as JPEG 2000, may also be employed.

By transmitting and receiving data in a standardized, universal data format such as JPEG in this manner, the data format can be standardized among the transmitted and received units. Moreover, a data format conversion system maintaining both data quality and data transmission/reception efficiency can be constructed.

Further, when the image data are binary data, a standardized, universal image compression/expansion format such as an MHMR/MMR method may be used.

Figure 12:
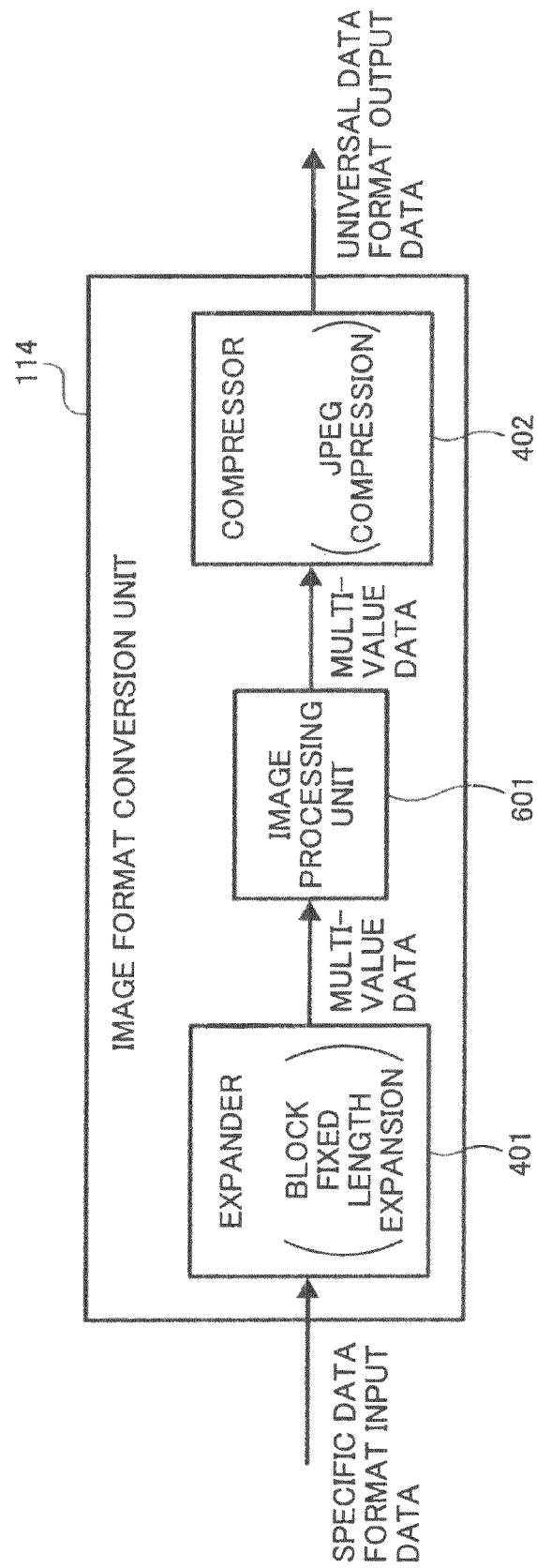

Next, in the example in FIG. 12, the image data input into the image format conversion unit 114 are compressed into a data format specific to the image processing apparatus 100, while the output image data have the same universal data format as the output image data in the example of FIG. 11. Here, the term "specific data format" denotes a data format which is specific to the image processing apparatus 100 rather than a universal data format such as JPEG or JPEG 2000 that can normally be used in any typical PC or the like.

In the expander 401, a specific block fixed length expansion method which maintains compression efficiency or data processing efficiency is used as the expansion method for expanding the data from the specific data format. The compression method of the compressor 402 uses the same universal data format as that of the example in FIG. 11.

Image data that have been subjected to specific block fixed length compression and then input into the image format conversion unit 114 are expanded by the expander 401 and thus returned to multi-value data. The image data are then subjected to image processing by the image processing unit 601 on the basis of the aforementioned processing mode. When the image data are to be output back to the outside, JPEG compression is performed by the compressor 402, whereupon the image data are output in a universal data format.

In the example shown in FIG. 12, a specific data format is applied to the specific block fixed length compressed data, and therefore variation in the compression ratio of image data in particular can be fixed and managed. Further, since the data are handled in block units, data processing such as rotation of the image orientation and alignment can be performed easily. Note that fixed length block encoding and decoding methods are well-known, and hence detailed description thereof has been omitted (if necessary, see Japanese Unexamined Patent Application Publication H11-331844). When the image data are binary data, the technique disclosed in Japanese Unexamined Patent Application Publication 2002-077627, for example, may be used.

Further, by transmitting image data in a standardized, universal data format such as JPEG, the data format can be standardized among the transmitted units, and a data format conversion system maintaining both data quality and data transmission/reception efficiency can be constructed.

Note that when the image data are binary data, a standardized, universal image compression/expansion format such as an MHMR/MMR method may be used in the compressor 402.

Figure 13:
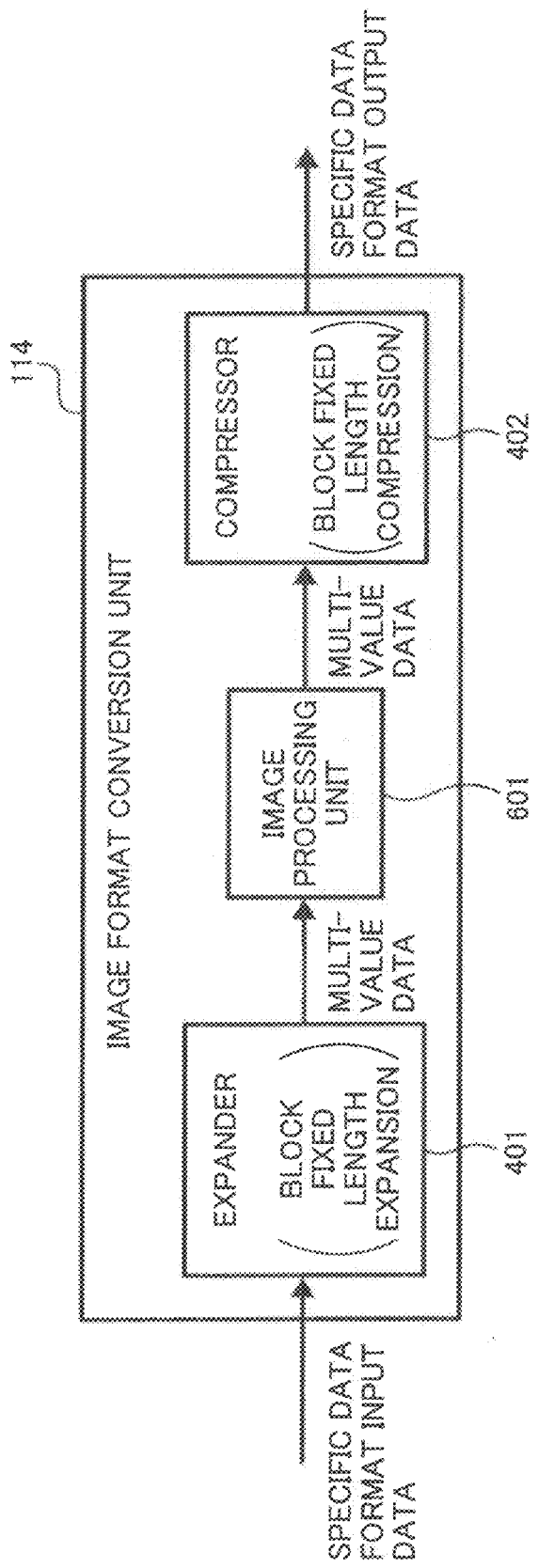

In the example in FIG. 13, in contrast to the example in FIG. 12, the image data output from the image format conversion unit 114 are compressed into the same specific data format of the image processing apparatus 100 as the image data that are input into the image format conversion unit 114. Hence, in the compressor 402, the image data are compressed into the specific data format through block fixed length compression.

When a specific data format is applied to the specific block fixed length compressed data in this manner, variation in the compression ratio of image data in particular can be fixed and managed. Further, since the image data are handled in block units, data processing such as rotation of the image orientation and alignment can be performed easily. Note that fixed length block encoding and decoding methods are well-known, and hence detailed description thereof has been omitted (if necessary, see Japanese Unexamined Patent Application Publication H11-331844). When the image data are binary data, the technique disclosed in Japanese Unexamined Patent Application Publication 2002-077627, for example, may be used.

Next, the resolution converter 501 will be described.

Figure 14A:
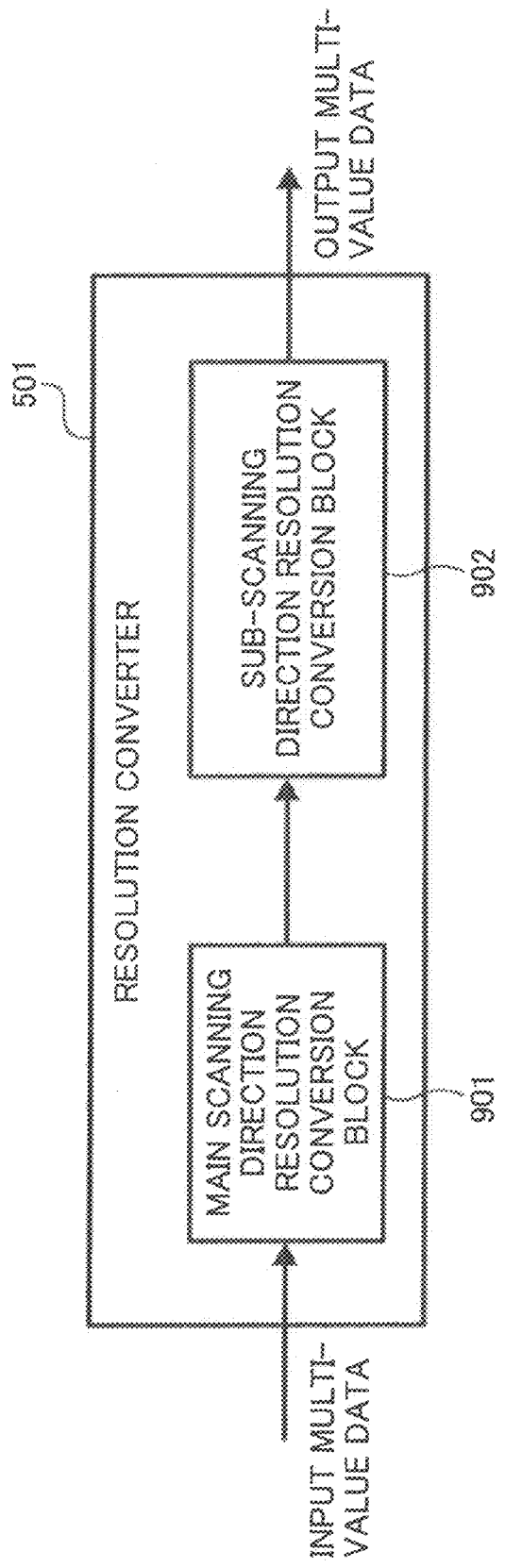

Here, an example will be described in which the subject image data are multi-value data and conversion to a desired resolution is possible in both the main scanning direction and sub-scanning direction. As shown in FIG. 14A, the resolution converter 501 is constituted by a main scanning direction resolution conversion block 901 for performing resolution conversion on the input multi-value data in the main scanning direction, and a sub-scanning direction resolution conversion block 902 for performing resolution conversion on the multi-value data in the sub-scanning direction following conversion in the main scanning direction.

As shown in FIG. 14B, in the main scanning direction resolution conversion block 901, pixel interpolation is performed in the main scanning direction to convert the input multi-value data into the data amount required for conversion to the specified resolution. A typical nearest pixel replacement method, a method employing the weighted average of two adjacent pixels, a cubic convolution method, and so on may be used as a method for calculating the value of the pixel data to be interpolated. More specifically, the image data are stored in a plurality of FFs (flip-flops) 903 capable of latching each bit of data, and the data value to be interpolated is calculated by an interpolation pixel calculation unit 904.

Figure 14C:
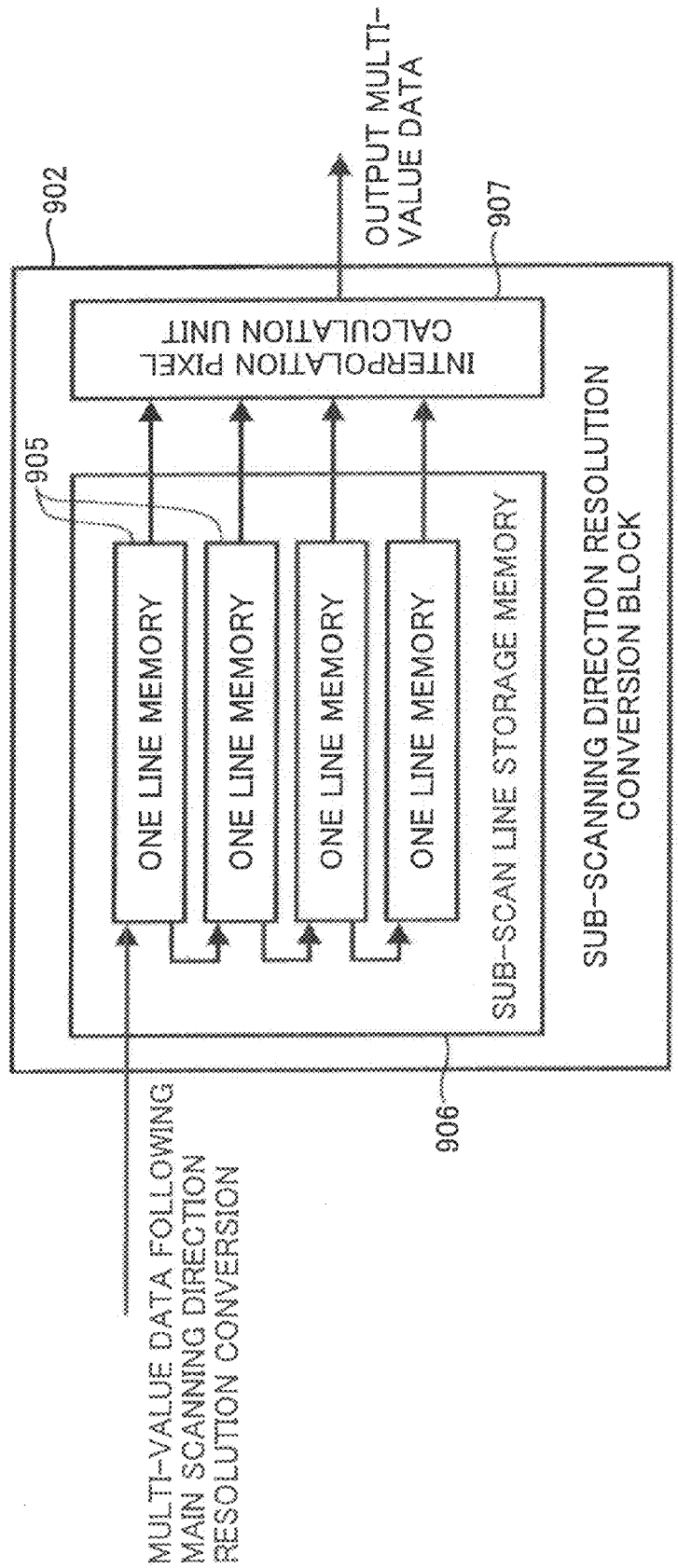

Next, as shown in FIG. 14C, in the sub-scanning direction resolution conversion block 902, the data that have been subjected to main scanning direction resolution conversion are stored in a sub-scanning line storage memory 906 comprising a plurality of one line memories 905 each capable of storing one line of the main scanning resolution-converted data. The data lines are then extracted from the sub-scanning line storage memory 906, and an interpolation pixel calculation unit 907 calculates the data value of the line to be interpolated on the basis of sub-scanning direction reference pixel data. Similarly to the main scanning direction, a nearest neighbor pixel replacement method, a method employing the weighted average of two adjacent pixels, a cubic convolution method, and so on may be used as the calculation method.

Next, the processing of the filter processing unit 502 will be described. Filter processing is employed to modulate the MTF of the image data, and consists of two types of processing: processing to emphasize the edges of the image by increasing the MTF value beyond that of the original image data; and processing to smooth the image by lowering the MTF value.

FIG. 15A shows a case in which the MTF of the image data is raised. The solid line in FIG. 15A shows the picture frequency of the base image, and the broken line shows the picture frequency following filter processing. When raising the MTF of the image data, processing is implemented to emphasize the ridges of the picture frequency. Note that the ordinate shows the dynamic range of the image density, while the abscissa shows the raster reference of the image data.

Similarly, as shown in FIG. 15B, when smoothing the MTF of the image data, processing is implemented to suppress the ridges of the image frequency. In the actual processing, the raster direction of the two-dimensional image data is set as a line direction (x direction), the other direction is set as the γ direction, and the image data are handled in line units. The value of a target pixel is calculated on the basis of the values of surrounding pixels.

As shown in FIG. 15C, the 5×5 pixels surrounding a target pixel $X_{n,m}$ are encoded in accordance with the target pixel $X_{n,m}$.

To increase the MTF of the image data, differential coefficients of the image frequency to be emphasized are calculated. The coefficients (matrix coefficients hereafter) are arranged in a matrix form based on the resolution of the image data. When the matrix coefficients are encoded as $A_{n-2, m-2}$, $A_{n-2, m-1}$, ..., $A_{n, m}$, $A_{n+2, m+1}$, $A_{n+2, m+2}$, i.e. in the same format as the surrounding pixel codes, the target pixel Y following filter processing to raise the MTF of the image data can be expressed by the following equations.

$$B = (X_{n-2,m-2} \times A_{n-2,m-2}) + (X_{n-2,m-1} \times A_{n-2,m-1}) + \ldots + (X_{n+2,m+2} \times A_{n+2,m+2})$$   Equation (1)

$$D = B \times C$$   Equation (2)

$$Y = D + X_{n,m}$$   Equation (3)

Equation (1) is used to calculate the matrix product of the matrix coefficients determined by the differential coefficients and the image data. The value of B determined by Equation (1) is the image emphasis component of the filter processing. Equation (2) is used to amplify or dampen this emphasis component arbitrarily. By adding the filter processing emphasis value determined in Equation (2) to the target pixel value, the final target pixel value Y is calculated (Equation (3)). By converting a base pixel of the image data using the calculation described above, the MTF of the image data is raised.

When smoothing the image data, the value of the target pixel is added to the values of the surrounding pixels, and the sum thereof is divided by a number of pixels E to obtain an average value of the target pixel and its surrounding pixels. By converting a base pixel of the image data with this calculation, the image data can be smoothed. To adjust the smoothness, the weightings of the target pixel and surrounding pixels may be considered equivalent instead of calculating the average thereof, and an offset may be inserted between the pixels. Then, by inserting an arbitrary integer into the matrix coefficients as shown in Equation (4) below, the target pixel value Y can be adjusted.

$$Y = ((X_{n-2,m-2} \times A_{n-2,m-2}) + (X_{n-2,m-1} \times A_{n-2,m-1}) + \ldots + (X_{n+2,m+2} \times A_{n+2,m+2}))/E$$   Equation (4)

By means of processing such as that described above, a filter processing function allowing MTF modulation of multi-value image data can be realized in the filter processing unit 502. As a result, when the original image is a character-oriented image, the image quality is improved by performing MTF emphasis. Further, when the image is picture-oriented, the image quality is improved by applying smoothness through slight smoothing. By selecting a filter coefficient corresponding to the type of image in this manner, a high quality image can be obtained.

Figure 16A:
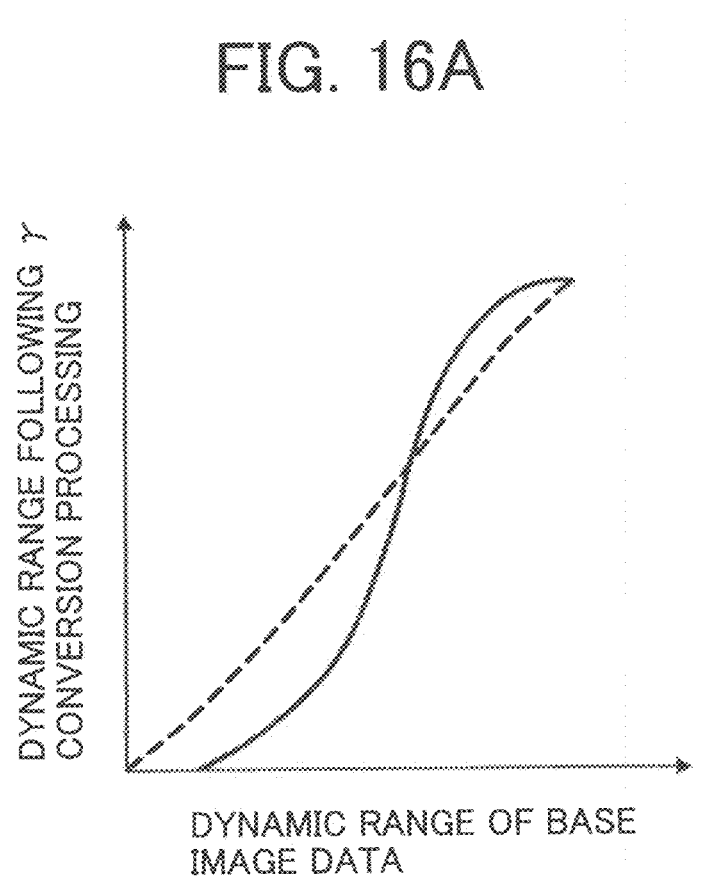
FIGS. 16A and 16B are views illustrating γ processing.

Next, the processing of the density γ unit 503 will be described. The γ conversion processing performed by the density γ unit 503 is used to make the density gradient and density characteristic of the image variable. As shown in FIG. 16A, when a solid line denotes a γ conversion table, a value corresponding to base image data (abscissa) is simply converted to a value of the image data following γ conversion (ordinate) in accordance with the graph. By modifying the curve of the conversion table, image data having a desired density distribution can be obtained. For example, when a γ conversion table such as that illustrated by the broken line in FIG. 16A is set, the image data following γ conversion can be converted into image data having a smoother density gradient than the image data of the γ conversion table illustrated by the solid line. Note that in FIG. 16A, the density increases toward the side of the arrow in the drawing.

Figure 16B:
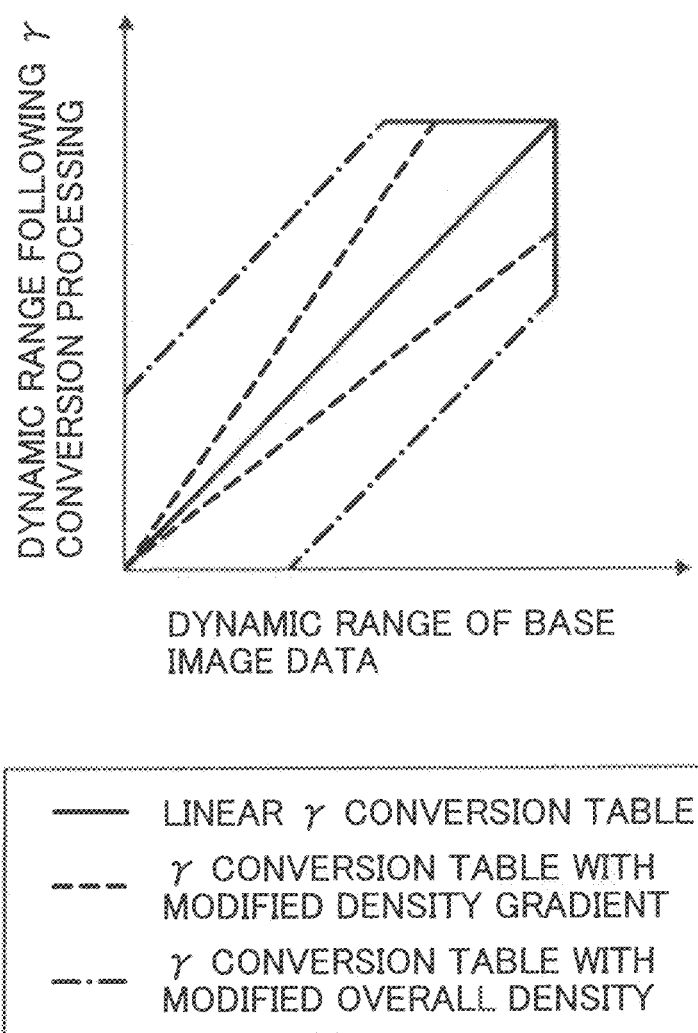

A method for creating the γ conversion table will now be described, for convenience, on the basis of a linear γ conversion table which extends in a 45° direction from an origin, as shown in FIG. 16B (solid line).

As shown in FIG. 16B, to increase or decrease the overall density of the image without altering the density characteristic, the γ conversion table (broken lines) may be parallel shifted in the abscissa direction of the graph, and to alter the density gradient of the image, the inclination of the γ conversion table is modified. To modify the density characteristic so as to obtain a desired density characteristic, the bends of the γ conversion table are modified to achieve a continuous curve such as that shown in FIG. 16A.

In so doing, a γ conversion processing function enabling modification of the density gradient and density characteristic of multi-value image data can be realized in the density γ unit 503. By selecting a γ curve corresponding to the image type, a high quality image can be obtained.

Next, the processing of the halftone processing unit 504 will be described. The halftone processing unit 504 performs processing to quantize multi-value image data into a binary format or a small gradation number value in the vicinity thereof, and various specific methods exist for this purpose. Here, simple quantization, dithering, and error diffusion, all of which are in general use, will be described. The number of quantized gradations is set to a binary format for convenience.

In simple quantization, multi-value image data are converted into binary image data by defining an arbitrary value within the dynamic range of the image data as a threshold. For example, to quantize 256-gradient multi-value image data into image data having 0 and 1 values by defining 128 in the dynamic range of 0 to 255 as the threshold, image data of 100 and 200 are quantized into quantization values of 0 and 1, respectively.

Figure 17A:
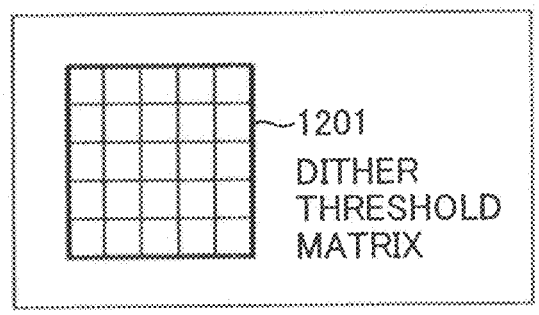
FIGS. 17A and 17B are views illustrating dithering.
Figure 17B:
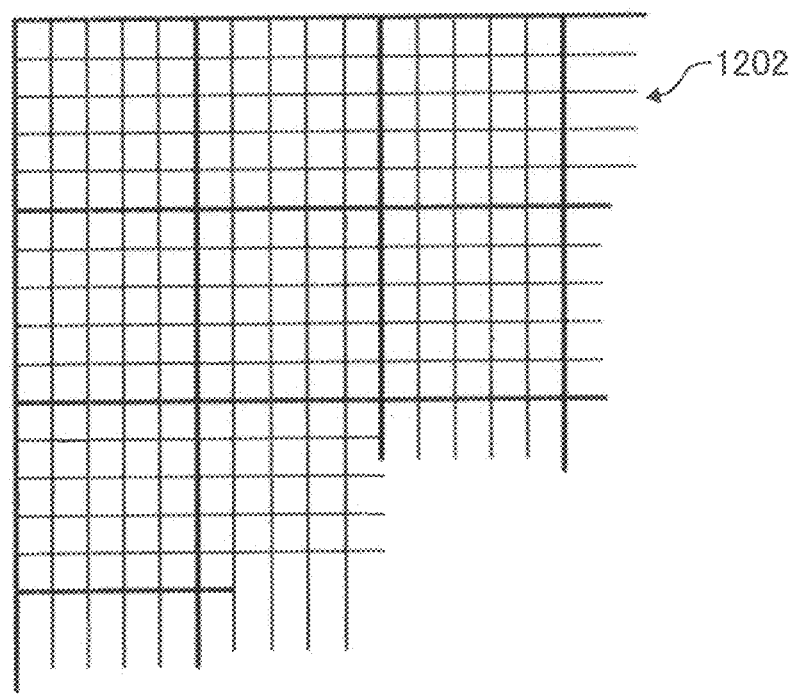

In dithering, a matrix-form threshold is used and a dither threshold matrix 1201 shown in FIG. 17A is set such that one threshold is assigned to one pixel. Thus a tile form is applied to image data 1202 shown in FIG. 17B, and the image data are quantized per pixel into binary image data. When the thresholds in the matrix are set to be variable within the dynamic range of the image data, a tradeoff is made with the resolution of the image. However, halftone density can be reproduced even with binarized image data.

Error diffusion quantizes multi-value image data into binary image data by defining an arbitrary value, similarly to simple quantization. Here, however, a quantization error occurring during quantization is stored, and quantization is performed on a target pixel taking into consideration errors in the surrounding pixels, which are determined after quantization processing is finished in accordance with the raster order. Thus, halftone processing is performed in such a manner that errors caused by quantization of the entire image data can be held to a minimum.

An error occurring during quantization will now be described. When 256-gradient multi-value image data within a dynamic range of 0 to 255 are quantized into image data having values of 0 and 1, image data of 100 are quantized into a quantization value of 0. Thus, even when the image data comprises halftone density information indicated by 100, this is handled as the minimum value of 0, and hence the halftone density information of the image data is lost. As a result, the quantization error of the image data becomes "100=100–0" (i.e. the minimum value of the dynamic range). Further, image data of 200 are quantized into a quantization value of 1. Thus, even when the image data comprises halftone density information indicated by 200, this is handled as the maximum value of 1, and hence the quantization error of the image data becomes "–55=200–255" (i.e. the maximum value of the dynamic range).

Figure 18:
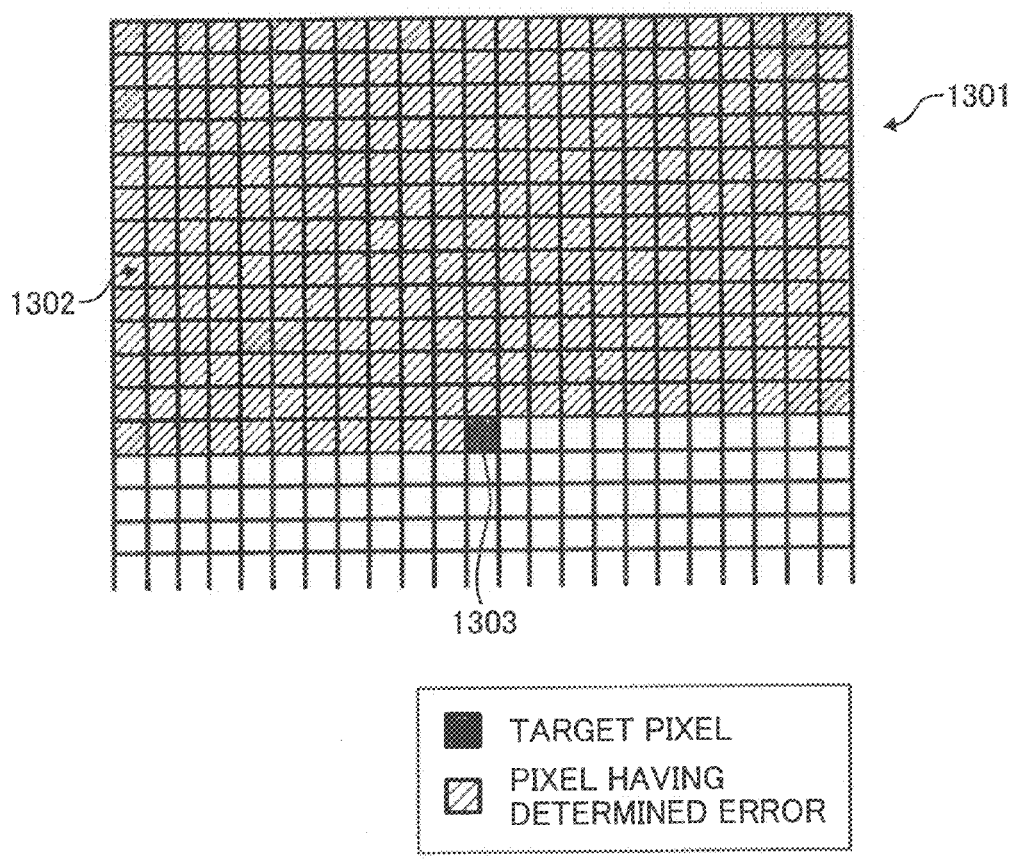
FIG. 18 is a view illustrating error diffusion.

These quantization errors are stored separately from the image data after quantization per pixel is complete. As shown in FIG. 18, image data 1301 are processed in raster order, and therefore quantization errors of shaded pixels 1302 are already determined and stored. In error diffusion, binarization is performed by adding an average of the determined quantization errors of the surrounding pixels of a target pixel 1303 to the value of the target pixel. As a result, loss of the halftone density information caused by quantization errors in the entire image data can be suppressed.

By means of these methods, binarization processing can be performed on multi-value image data in the halftone processing unit 504. As a result, the data volume can be reduced, and by selecting halftone processing corresponding to the type of image, a high quality image can be obtained.

Further, when the subject image data are binary data, the number of gradations can be modified using the following Equation (5) to convert the data into 256 value data. When the subject image data are binary data, space filtering is implemented with reference to the surrounding pixels (in a two-dimensional matrix) of 1 bit target pixel data. The one-bit data are converted into 8 bit data having a value of 0 when the value thereof is 0 and having a value of 255 when the value thereof is 1. Thus filter calculation is performed on the basis of an equation with the matrix coefficients shown in Equation (5). By means of this calculation, binary data can be converted into multi-value data.

$$\text{Filter coefficients } [x, y] = \begin{matrix} 1, 2, 3, 4, 3, 2, 1, \\ 2, 3, 7, 8, 7, 4, 2, \\ 3, 7, 9, 11, 9, 7, 3, \\ 2, 3, 7, 8, 7, 4, 2, \\ 1, 2, 3, 4, 3, 2, 1 \end{matrix}; \quad \text{Equation (5)}$$

$$\text{Output 256 value data } [ij] =$$

$$1/256 \sum_{X=-3}^{3} \sum_{y=-3}^{3} (\text{filter coefficients } [x, y] * \text{pixel data } [i+xj+y]$$

Next, parameter setting by the image format conversion unit 114 will be described. When each client apparatus 117 requests distribution of the image data stored in the HDD 105, setting of the attributes of the image to be received (captured) is performed from the client apparatus (PC) 117 side. Parameter values of the image data in the image format conversion unit 114 are determined and set on the image processing apparatus 100 side from the attributes of the image data specified by an image capture request signal from the client apparatus 117 and the attributes of the image data stored in the HDD 105. More specifically, parameter values for each of resolution conversion, filter processing, γ conversion processing, and halftone processing are modified, and image data subjected to image processing based on these parameter values are distributed to the client apparatus 117.

Figure 19:
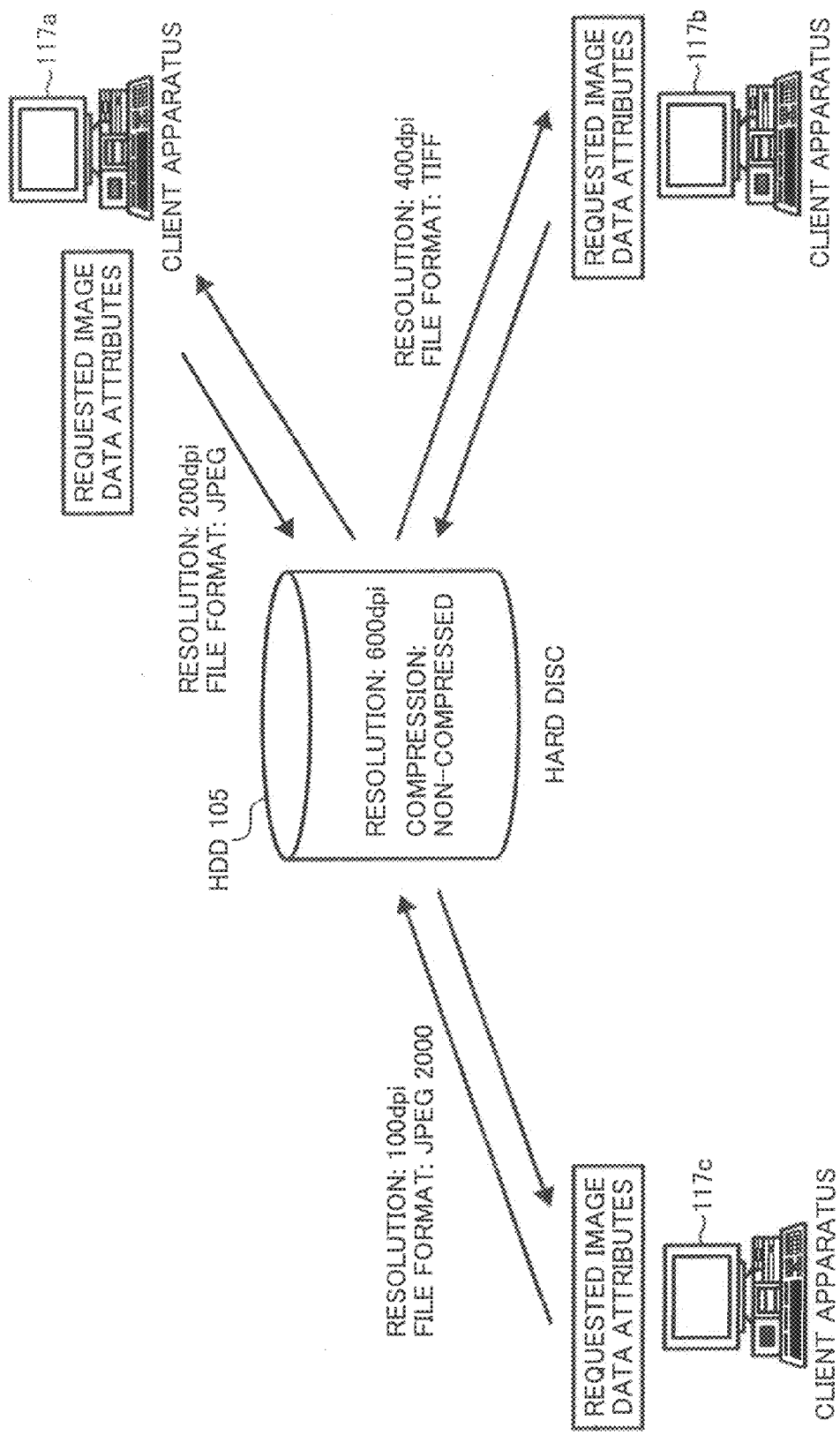
FIG. 19 is a view illustrating processing performed when image data are distributed to external client apparatuses.

As shown in FIG. 19, for example, it is assumed that the image data stored in the HDD 105 are non-compressed and have a resolution of 600 dpi. A request is received from each client apparatus 117 for image data having various attributes: from a client apparatus 117a a request for reception (capture) of a JPEG image having a resolution of 200 dpi is received; from a client apparatus 117b a request for reception (capture) of a TIFF image having a resolution of 400 dpi is received; and from a client apparatus 117c a request for reception (capture) of a JPEG 2000 image having a resolution of 100 dpi is received. The image format conversion unit 114 receives the respective requests and performs image processing corresponding to the requests of each client apparatus 117 (117a to 117c). The image data stored in the HDD 105 are non-compressed, and therefore the expander 401 is bypassed.

Next, in the resolution conversion unit 501, resolution conversion parameter values are determined from the resolution requests of the client apparatuses 117 (117a to 117c) and the resolution of the image data stored in the HDD 105. Resolution conversion is then implemented to convert the resolution of the image data stored in the HDD 105 from 600 dpi to 200 dpi for the client apparatus 117a, from 600 dpi to 400 dpi for the client apparatus 117b, and from 600 dpi to 100 dpi for the client apparatus 117c.

Next, in the compressor 402, conversion processing is implemented to convert the format of the image data stored in the HDD 105 to a JPEG file format for the client apparatus 117a, a TIFF file format for the client apparatus 117b, and a JPEG 2000 file format for the client apparatus 117c.

In addition to the image data, the HDD 105 stores attribute information obtained when the image data input from an operating unit (not shown) of the image processing apparatus 100 are read. Hence, if the attributes of the image data stored in the HDD 105 are to be inherited without modification when each client apparatus receives (captures) the image data from the image processing apparatus 100, all or a part of the information relating to the managed data format may be converted automatically by the image format conversion unit 114 together with the image data without specifying the attributes of the image data to be captured. In so doing, the operation to set the attributes of the image data to be captured on the client apparatuses 117 can be omitted, leading to an improvement in operability.

Figure 20:
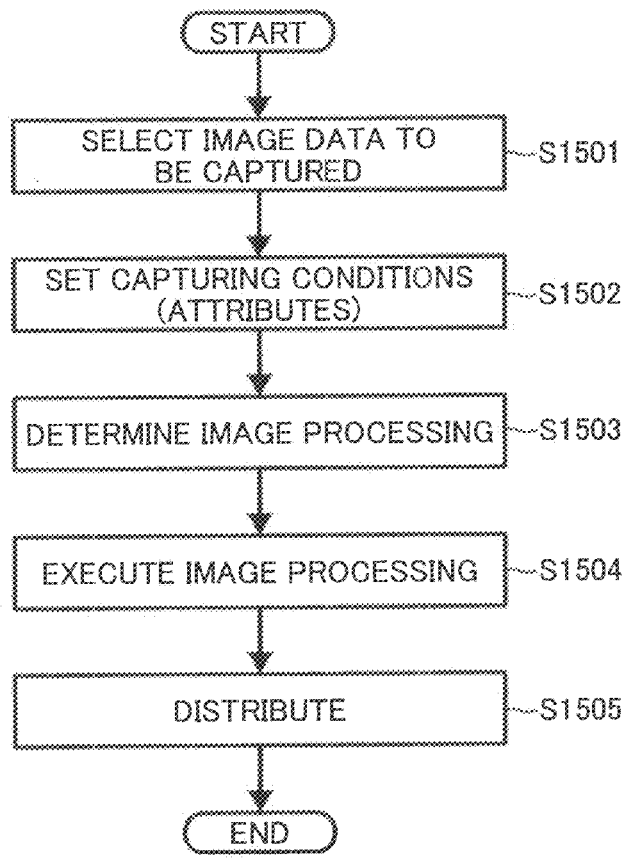
FIG. 20 is a flowchart illustrating an image data capture processing procedure.

Next, an image data capture processing procedure using the image processing system according to the first embodiment will be described. FIG. 20 is a flowchart illustrating this image data capture processing procedure.

First, a user selects image data (stored in the HDD 105) to be captured on the client apparatus 117 (step S1501). Next, capturing conditions (attributes) of the image data to be captured are specified from the client apparatus 117 (step S1502). Here, the specified capturing conditions relate to the resolution of the image data, filter processing, γ conversion processing, halftone processing, the output format, and so on, for example.

Next, the printer controller 104 examines the image data attributes selected in the step S1501, and determines the type of image processing to be executed in order to satisfy the capturing conditions specified in the step S1502 (step S1503).

The image format conversion unit 114 then executes the image processing determined in the step S1503 on the image data selected in the step S1501 (step S1504).

Finally, the image data subjected to all of the required image processing by the image format conversion unit 114 are distributed to the client apparatus 117 which requested capture (step S1505).

Figure 21:
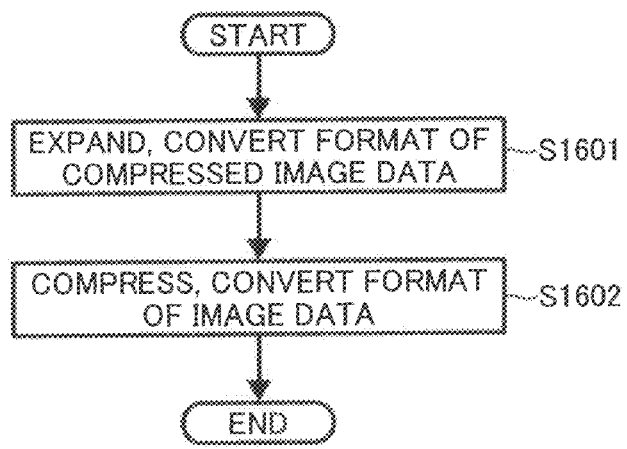
FIGS. 21 and 22 are flowcharts illustrating an image format conversion processing procedure.

Next, the image data processing procedure performed in the image format conversion unit 114 will be described. First, a case in which image data that have been subjected to binary reversible compression specific to the printer machine are stored in the HDD 105, converted into universal binary compressed data, and distributed to the client apparatus 117 will be described. FIG. 21 is a flowchart illustrating a format conversion processing procedure in this case.

First, the apparatus-specific binary reversible compressed data are downloaded from the HDD 105 and expanded/converted by the expander 401 of the image format conversion unit 114 (step S1601). Next, the data are compressed by the compressor 402 using an MH/MR/MMR method, which is a universal binary reversible compression method, and a predetermined TIFF format header is attached thereto (step S1602).

Figure 22:
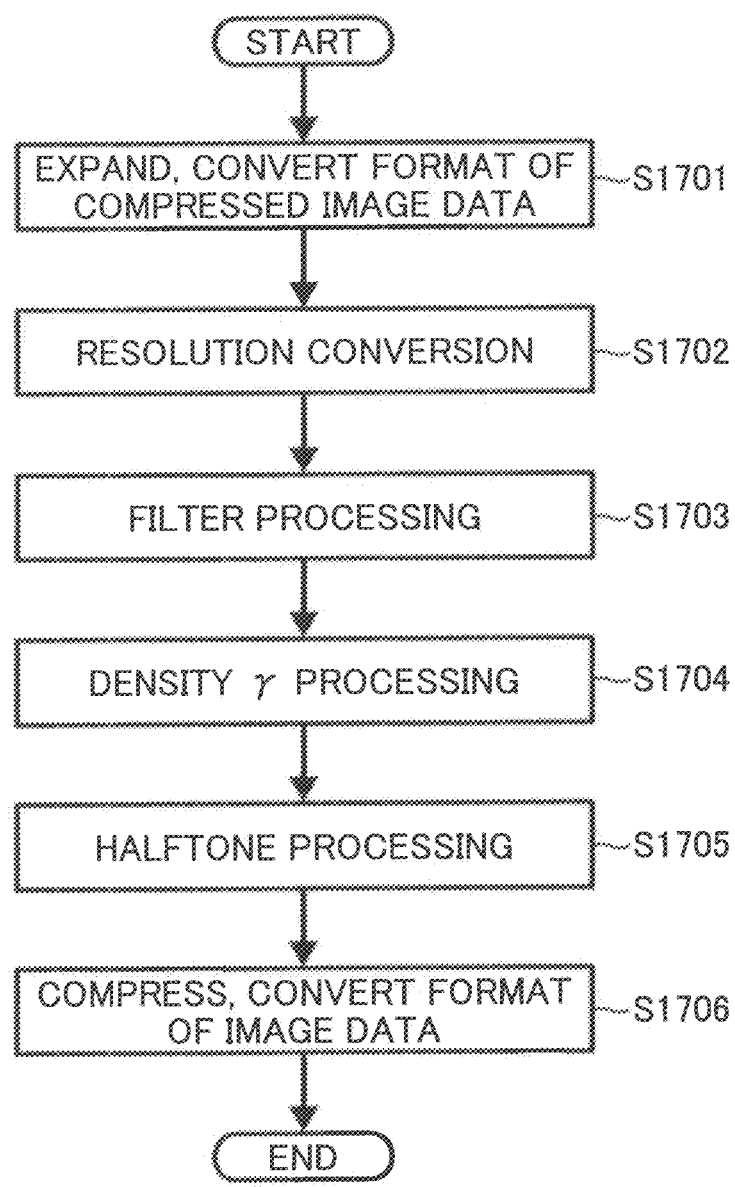

Next, a case in which copying image data are stored in the HDD 105, the resolution of the image data is converted, and the image data are distributed to the client apparatus 117 as binary image data will be described. FIG. 22 is a flowchart illustrating a format conversion processing procedure in this case.

First, the copying compressed image data are downloaded from the HDD 105 and expanded into a specific format by the expander 401 of the image format conversion unit 114 (step S1701). Next, the expanded image data are subjected to resolution conversion by the resolution converter 501 (step S1702). Next, emphasis filter processing of a desired intensity is implemented on the resolution-converted image data by the filter processing unit 502 (step S1703). The filter-processed image data are then subjected in succession to density γ conversion processing by the density γ unit 503 (step S1704) and binarization processing through error diffusion or the like by the halftone processing unit 504 (step S1705). Finally, the binary image data are compressed by the compressor 402 using a G3 compression method (step S1706).

By performing the processing described above, appropriate image processing is performed on the image data stored in the image processing apparatus 100 easily and efficiently, and thus image data can be distributed to the external client apparatus 117 in the desired format.

Further, by executing appropriate image processing for distribution to the external client apparatus 117, such as conversion of the image data resolution, magnification conversion, compression to a compression ratio suitable for distribution, and so on, appropriate image data can be distributed to the external client apparatus 117, and the image data can be viewed and edited easily on the external client apparatus 117.

Second Embodiment

Figure 23:
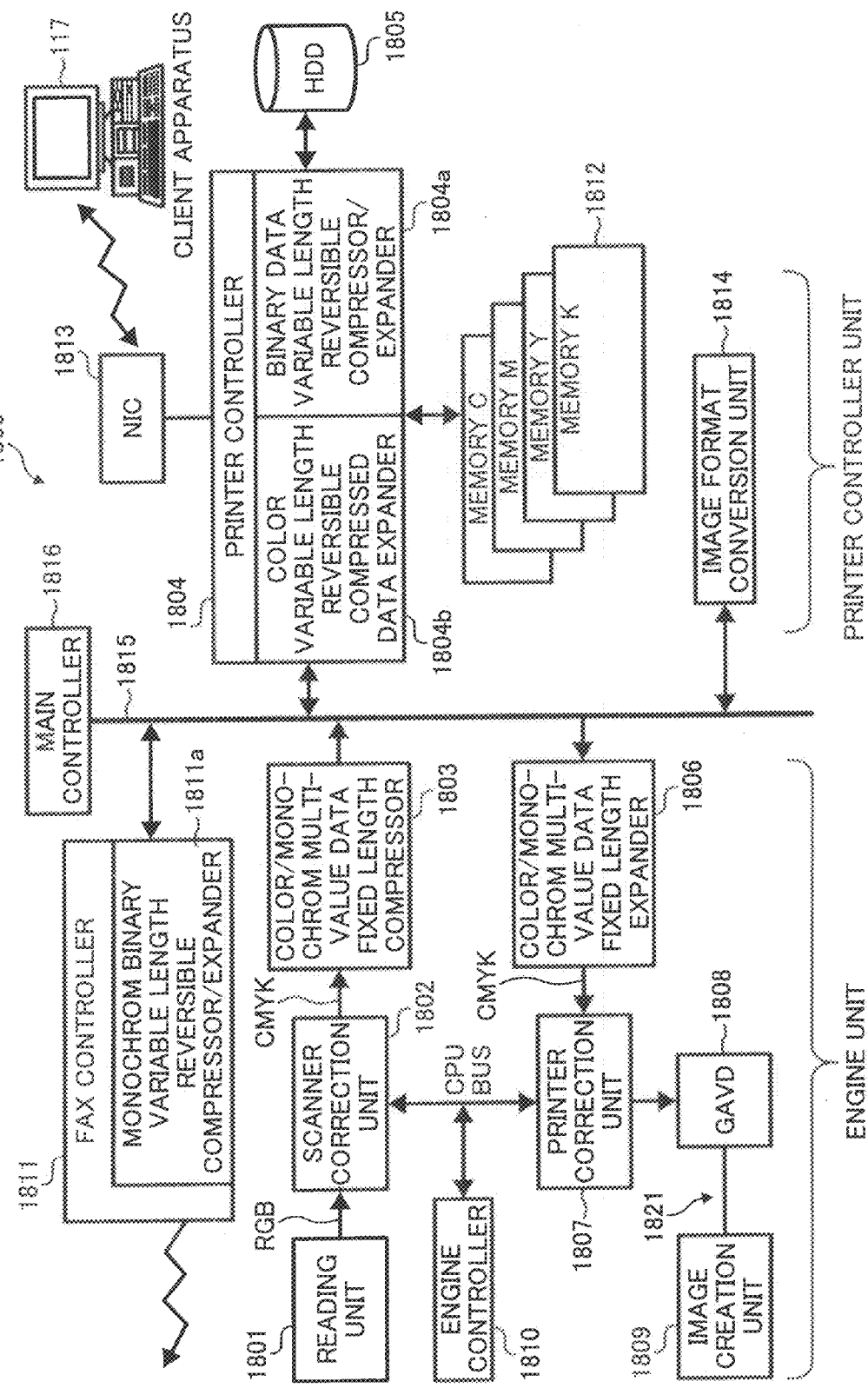
FIG. 23 is a block diagram showing the overall constitution of an image processing system according to a second embodiment of the present invention.

In a second embodiment, a color original image is downloaded, the image is temporarily converted into monochrome image data in the interior of the apparatus, and then the image is converted back into color image data and distributed. FIG. 23 shows the overall constitution of an image processing system according to the second embodiment. Similarly to the first embodiment, this image processing system is constituted by an image processing apparatus 1800, and an external client apparatus 117 which is connected to the image processing apparatus 1800 via a network. The image processing apparatus 1800 is assumed to be a so-called digital complex machine comprising a facsimile (FAX) function, a printer function, and a function for distributing an input image (a read original image or an image that is input using the printer function or FAX function).

As elements used in a copying function, the image processing apparatus 1800 comprises a reading unit 1801 for reading an original as color image data, a scanner correction unit 1802 for implementing predetermined image processing on the image data that are read by the reading unit 1801, a color/monochrome multi-value data fixed length compressor 1803 for compressing the color/monochrome multi-value data output from the scanner correction unit 1802, and an HDD (Hard Disk Drive) 1805 for storing the compressed data.

As an element used in the FAX function, the image processing apparatus 1800 comprises a FAX controller 1811 which is connected to a PSTN in order to transmit and receive FAX signals and comprises a binary data variable length reversible expander 1811a for returning received compressed FAX data to the original data.

As elements used in the printer function, the image processing apparatus 1800 comprises an NIC 1813 for performing communication with the network-connected external client apparatus 117, and a printer controller 1804 for performing raster image processing (RIP) in accordance with a print command received from the client apparatus 117 via the NIC 1813, and performing data-specific compression following the RIP.

As an element used in the image data distribution function, the image processing apparatus 1800 comprises an image format conversion unit 1814 (to be described in detail hereafter) for converting data generated during usage of the respective functions described above and stored in the HDD 1805 into a data format conforming to the user terminal at the transfer destination (the client apparatus 117).

When printing output (image format ion processing) is performed on image data generated using the functions described above, the data stored in the HDD 1805 are used. To return the stored compressed data to the original data, a color/monochrome multi-value data fixed length expander 1806 is provided in relation to the copying function, while a binary data variable length reversible expander 1804a and a color variable length reversible compressed data expander 1804b are provided in the printer controller 1804 in relation to the FAX and printer functions. Further, an engine unit 1821 constituted by a printer correction unit 1807 for implementing correction on the expanded data, a GAVD 1808, and an image creation unit 1809 is provided as means for performing the image formation processing. Note that the scanner correction unit 1802 and the engine unit 1821 constituted by the printer correction unit 1807 and so on are controlled by an engine controller 1810.

The entire image processing apparatus 1800 is controlled by a main controller 1816.

Next, an operation of the functions of the image processing apparatus 1800 constituted by the above elements will be described in more detail.

Figure 24:
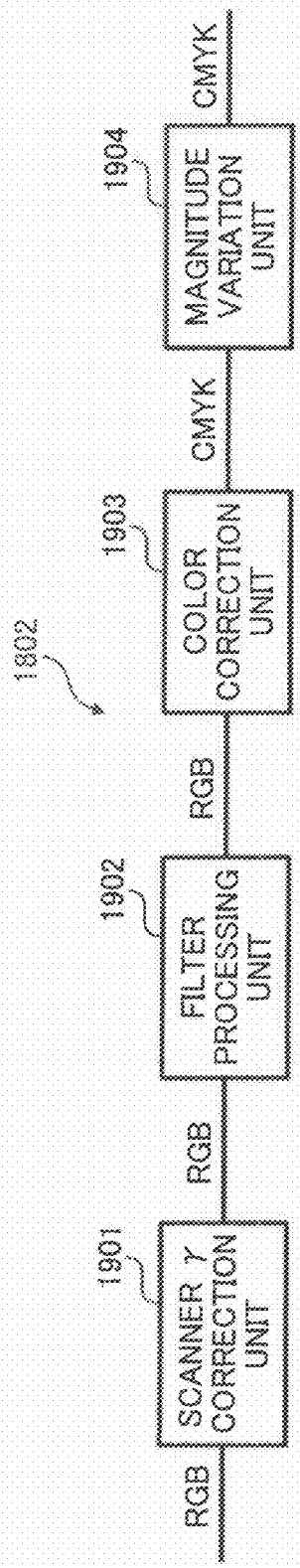
FIG. 24 is a block diagram showing the constitution of a scanner correction unit in the system.

First, processing performing during use of the copying function will be described. When reading an original, the original is set on an original table and read by the reading unit 1801, whereupon image data separated into R, G, B colors are transmitted to the scanner correction unit 1802. FIG. 24 shows the constitution of the scanner correction unit 1802. In the scanner correction unit 1802, scanner γ correction processing is performed by a scanner γ correction unit 1901, and filter processing is performed by a filter processing unit 1902. The filter-processed RGB image data are then converted into CMYK image data during color correction processing performed by a color correction unit 1903. The CMYK image data are then subjected to magnitude variation processing by a magnitude variation unit 1904. Following magnitude variation to obtain 8 bit color data for each of the CMYK colors, the data are compressed by the color/monochrome multi-value data fixed length compressor 1803 and thus converted into 2 bit image data for each of the colors.

The CMYK image data compressed by the color/monochrome multi-value data fixed length compressor 1803 are transmitted to the printer controller 1804 via a universal bus 1815. The printer controller 1804 comprises an independent semiconductor memory 1812 for each color, and the transmitted data are stored here. The resolution of the scanned image in the second embodiment is 600 dpi, and therefore the stored resolution during copying is 600 dpi.

Similarly to the first embodiment, the stored image data are written to the HDD 1805 as needed. This is performed to avoid the need to re-read the original if a paper blockage occurs during printout or printing is not completed correctly, and also for the purpose of electronic sorting. In recent years, an additional function for storing the read original so that the original can be output again as needed is provided.

Figure 25:
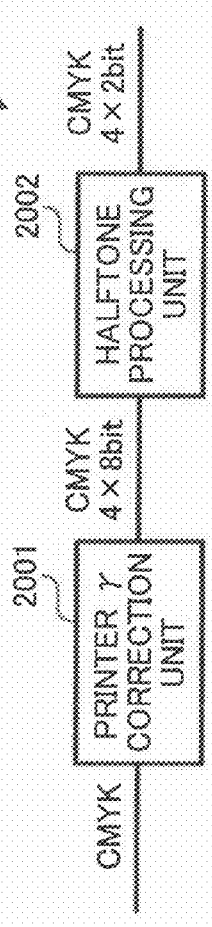
FIG. 25 is a block diagram showing the constitution of a printer correction unit in the system.

In either case, printing output is performed using the stored data from the HDD 1805, and hence during printing output, the CMYK compressed data in the HDD 1805 are first expanded to the semiconductor memory 1812, and then transmitted to the engine portion 1821 via the universal bus 1815. The image data are then converted back into CMYK 8 bit image data by the color/monochrome multi-value data fixed length expander 1806 of the engine unit 1821. Next, the expanded data are transmitted to the printer correction unit 1807. FIG. 25 shows the constitution of the printer correction unit 1807. As shown in FIG. 25, in the printer correction unit 1807, printer γ correction processing is performed on each of the CMYK colors by a printer γ correction unit 2001. Next, halftone processing corresponding to the GAVD 1808 and image creation unit 1809 is performed by a halftone processing unit 2002. The image data are then transmitted to a subsequent stage as data for use in image creation and output onto transfer paper.

The printer function is also activated upon reception of a print request from the client apparatus 117, which is connected via the NIC 1813. Pre-existing means may be applied to an operation of the printer controller 1804 and hence detailed description thereof has been omitted. In this case, however, 1 bit RIP data used as drawing data in the semiconductor memory 1812 are generated in accordance with a print request received from the client apparatus 117. The image data subjected to raster image processing (RIP) are compressed sequentially by a specific compressor of the printer controller 1804. Following RIP, the data size is large, and hence data compression is performed to prevent excessive memory consumption when the data are stored in the semiconductor memory 1812. The compressed image data are stored thus in the HDD 1805. Note that the resolutions during a printer operation are 300 dpi, 600 dpi, 1200 dpi, and so on.

The FAX function is activated when the FAX controller 1811 receives a FAX. Pre-existing means may be applied to an operation of the FAX controller 1811 and hence detailed description thereof has been omitted. In this case, however, the received compressed FAX signal is returned to the original data by the monochrome binary data variable length reversible compressor/expander 1811*a*, and thus an RIP image used as drawing data in the engine unit 1821 is generated. At this time, the RIP image data are stored in the HDD 1805, but since the data size is large following RIP, a great deal of memory is consumed when the data are stored in the semiconductor memory 1812 without undergoing compression. Therefore, compression is performed and the compressed data are stored in the HDD 1805. This compression processing is performed by the specific compressor provided in the printer controller 1804 similarly to the compression processing performing during use of the printer function. Note that the resolutions during a FAX operation are 200 dpi, 300 dpi, 400 dpi, and so on.

During a scanner operation, image data compressed by the specific compressor of the printer controller 1804, or image data not subjected to compression processing, are stored in the HDD 1805. The stored image data may also be binarized image data that have been subjected to halftone processing or multi-value image data. The scanner reading resolution in the copying of the second embodiment is 600 dpi, and therefore the resolution of the stored image data during scanning is 600 dpi.

As described above, in the second embodiment as well as the first embodiment, data having various resolutions and compressed into various formats exist in the HDD 1805 of the image processing apparatus 1800. Hence, as a principle of the second embodiment also, the image data stored in the HDD 1805 are converted by the image format conversion unit 1814 from a data format which is specific to apparatus characteristics into a universal data format which is not dependent on apparatus characteristics. Note that similarly in this embodiment, the type and format of the image data obtained by the client apparatus 117 are specified.

The constitution of the image format conversion unit 1814 will now be described. In the image format conversion unit 1814, the quality and format of the data to be obtained by the client apparatus 117 determine the image processing that is executed (the resolution, the type of filter processing, the type of γ conversion, the type of halftone processing, the universal compression method and whether or not universal compression is performed, the output format, and so on). In the following, only differences between the image format conversion unit 1814 and the image format conversion unit 114 in the system of the first embodiment will be described.

First, when the client apparatus 117 places a request for image data converted into universal binary compressed data and the image data are stored in the HDD 1805 in a binary reversible compressed format specific to the printer machine, the constitution illustrated in FIG. 9 is employed, and hence description thereof has been omitted.

Figure 26:
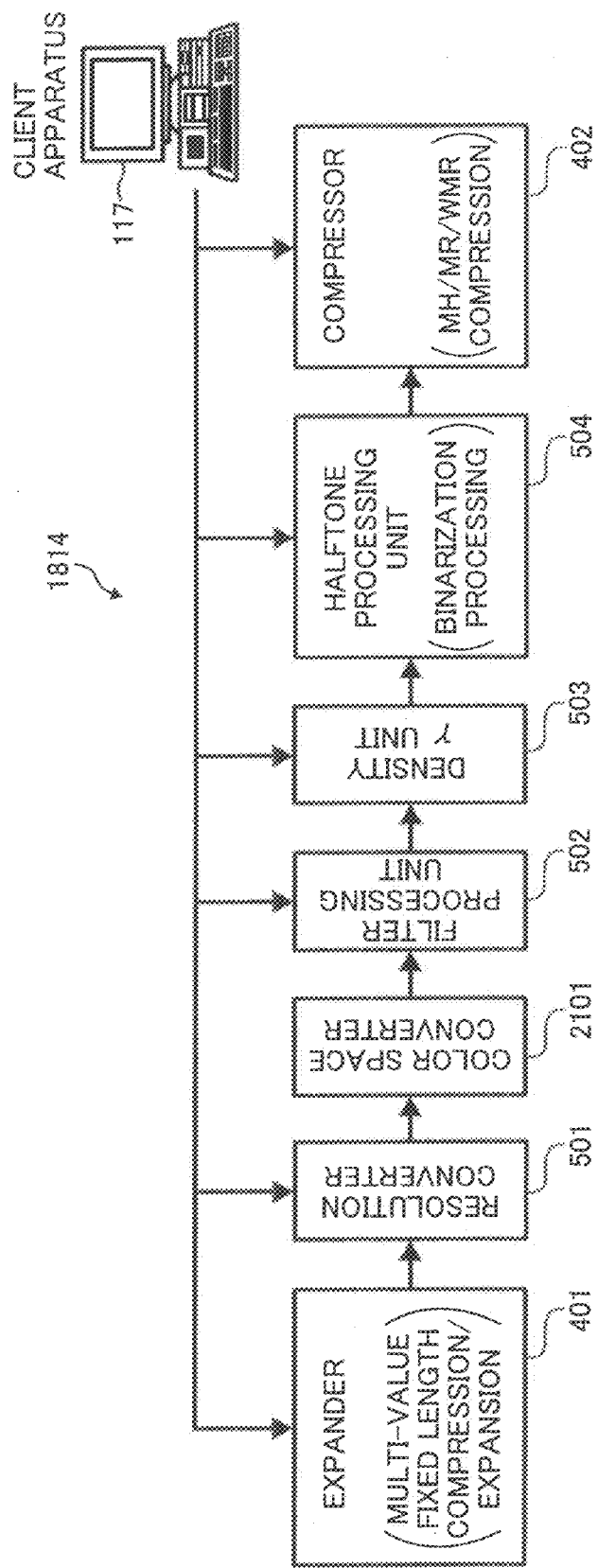
FIG. 26 is a block diagram showing a constitutional example of an image format conversion unit in the system.

Next, a constitutional example which is capable of responding to a case in which the external client apparatus 117 requests copying image data stored in the HDD 1805 in the form of ½ resolution binary image data will be described. As shown in FIG. 26, in this case the copying compressed image data downloaded from the HDD 1805 are expanded by the expander 401. Next, the expanded image data are subjected to resolution conversion by the resolution converter 501. When the resolution of the copying image data stored in the HDD 1805 is 600 dpi, for example, the data are converted to a resolution of 300 dpi, i.e. half the original resolution, by the resolution converter 501. Next, the resolution-converted image data are converted to color space data not dependent on apparatus characteristics by a color space converter 2101. The converted image data are then subjected to emphasis filter processing at a predetermined intensity by the filter processing unit 502. The filter-processed image data are then subjected in succession to density γ conversion processing by the density γ unit 503 and binarization processing, such as error diffusion or the like, by the halftone processing unit 504. Following this image processing, the image data are distributed to the client apparatus 117 via the NIC 1813. Note that the expander 401, resolution converter 501, filter processing unit 502, density γ unit 503, halftone processing unit 504, and compressor 402 have identical constitutions to those shown in FIG. 4.

Next, a color space conversion function exhibited by the color space converter 2101 will be described. In the following example, color space conversion is performed by table interpolation, which serves as an example of color space conversion.

In this processing, a predetermined look up table (LUT) is used. Each axis of the x, y, z directions is divided into eight (see FIG. 27A). The input color space is divided into upper and lower levels. The upper level refers to the LUT and the lower level performs three-dimensional interpolation. As a result, an accurate output is obtained.

Figure 27A:
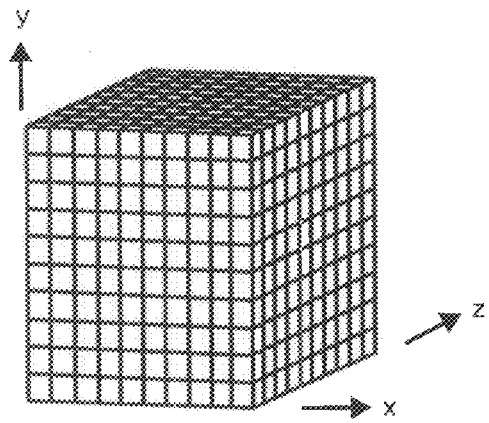
FIGS. 27A to 27C are views illustrating color space conversion processing.
Figure 27C:
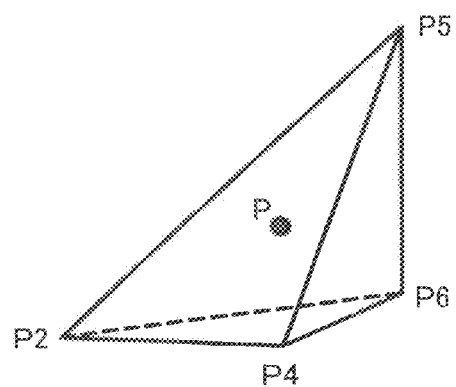
Figure 27B:
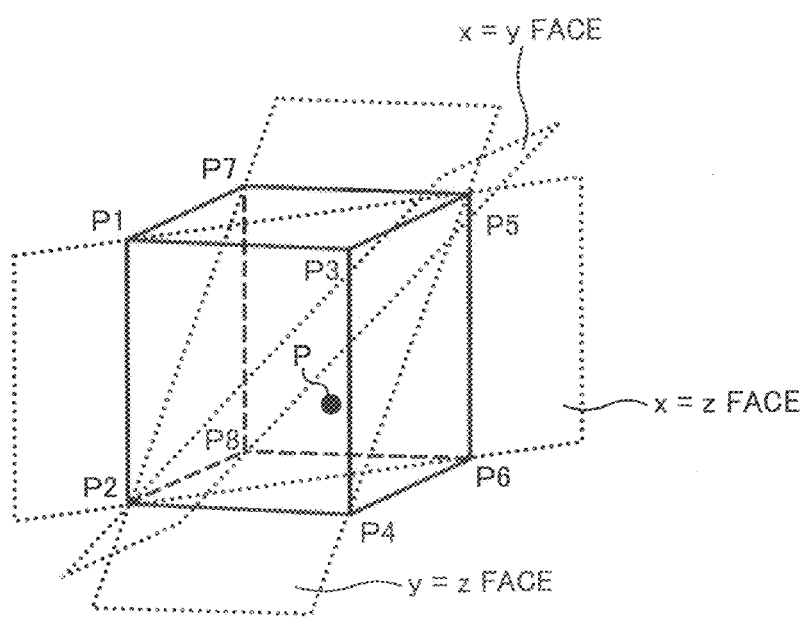

Numerous three-dimensional interpolation methods are known. In the following example, tetrahedral interpolation, which is the simplest of all linear interpolation methods, will be described. In tetrahedral interpolation, as shown in FIG. 27A, the input color space is divided into a plurality of unit cubes, and then further divided into six tetrahedrons sharing the symmetrical axes of the unit cube (FIG. 27B). Thus in an input color signal, parameters (lattice point parameters hereafter) of boundary points (lattice points) on a unit tetrahedron (FIG. 27C) selected according to the upper coordinates of the input color signal are referred to in the LUT. Next, a unit tetrahedron is selected according to the lower coordinates. Linear calculation is performed from the lattice point parameters thereof so that an output value can be obtained.

The actual processing procedure is as follows.
1. The unit cube containing an input color signal X (x, y, z) is selected.
2. The lower coordinates (□x, □y, □z) of the coordinates P in the selected unit cube are determined.
3. A unit tetrahedron is selected by comparing the lower coordinates and linear interpolation is performed on each unit tetrahedron to determine an output value $P_{out}$ at the coordinates P. Linear interpolation of each unit tetrahedron is calculated according to the following equations (note that here, the symbol "□" denotes the length of one side of the unit cube).

$$(\Box x < \Box y < \Box z) P_{out} = P2 + (P5-P7) \times \Box x/\Box + (P7-P8) \times \Box y/\Box + (P8-P2) \times \Box z/\Box$$

$$(\Box y \leq \Box x < \Box z) P_{out} = P2 + (P6-P8) \times \Box x/\Box + (P5-P6) \times \Box y/\Box + (P8-P2) \times \Box z/\Box$$

$$(\Box y < \Box z \leq \Box x) P_{out} = P2 + (P4-P2) \times \Box x/\Box + (P5-P6) \times \Box y/\Box + (P6-P4) \times \Box z/\Box$$

$$(\Box z \leq \Box y \leq \Box x) P_{out} = P2 + (P4-P2) \times \Box x/\Box + (P3-P4) \times \Box y/\Box + (P5-P3) \times \Box z/\Box$$

$$(\Box z \leq \Box x < \Box y) P_{out} = P2 + (P3-P1) \times \Box x/\Box + (P1-P2) \times \Box y/\Box + (P5-P3) \times \Box z/\Box$$

$$(\Box x < \Box z \leq \Box y) P_{out} = P2 + (P5-P7) \times \Box x/\Box + (P1-P1) \times \Box y/\Box + (P7-P1) \times \Box z/\Box$$

The parameters of the image format conversion unit 1814 are set similarly to the first embodiment (see FIG. 19), and hence description thereof has been omitted.

Figure 28:
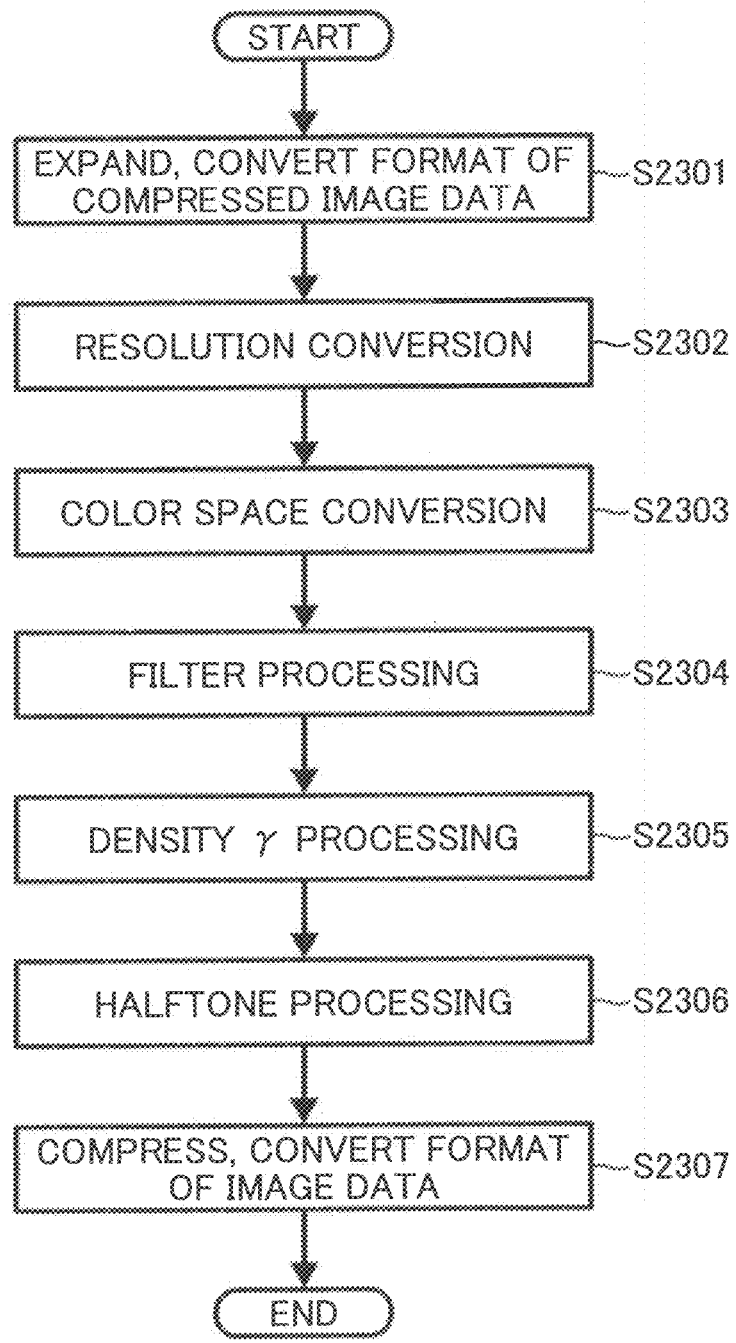
FIG. 28 is a flowchart illustrating an image format conversion processing procedure.

The image data capture processing procedure using the image processing system according to the second embodiment is also similar to the first embodiment. A case which differs from the first embodiment, in which copying image data are stored in the HDD 1805, the resolution of the image data is converted, and the image data are distributed to the client apparatus 117 as binary image data, will now be described. FIG. 28 is a flowchart illustrating the format conversion processing procedure performed in this case.

First, the copying compressed image data are downloaded from the HDD 1805 and expanded by the expander 401 of the image format conversion unit 1814 into a specific format (step S2301). Next, the expanded image data are subjected to resolution conversion by the resolution converter 501 (step S2302). Next, color space conversion processing is implemented on the resolution-converted image data by the color space converter 2101 (step S2303). The color space-converted image data are then subjected to emphasis filter processing of a desired intensity by the filter processing unit 502 (step S2304). The filter-processed image data are then subjected in succession to density γ conversion processing by the density γ unit 503 (step S2305) and binarization processing through error diffusion or the like by the halftone processing unit 504 (step S2306). Finally, the binary image data are compressed by the compressor 402 using a G3 compression method (step S2307).

By performing the processing described above, appropriate image processing is implemented on the image data stored in the image processing apparatus 1800 easily and efficiently, and thus image data can be distributed to the external client apparatus 117 in the desired format.

Third Embodiment

In a third embodiment, a color original image is downloaded, whereupon this color image is converted into monochrome image data and distributed. The overall constitution of the image processing system according to the third embodiment is similar to that of the second embodiment shown in FIG. 23. In the following, only differences with the second embodiment will be described.

Figure 29:
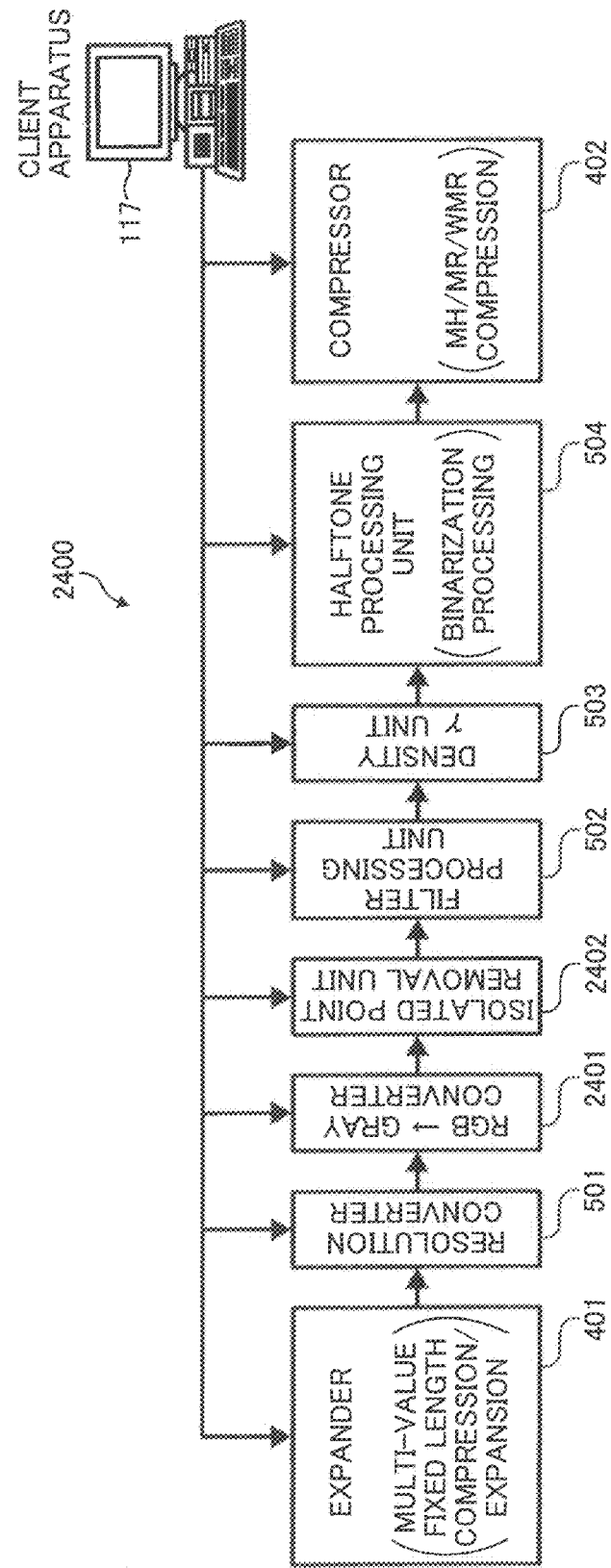
FIG. 29 is a block diagram showing a constitutional example of an image format conversion unit.

First, the constitution of an image format conversion unit 2400, which is a feature of the third embodiment, will be described. FIG. 29 shows the constitution of the image format conversion unit 2400.

The image data stored in the HDD 1805 are assumed to be the data of an image in a predetermined color space. Here, the image data correspond to an image in which data compression has been performed on each color of RGB using a fixed length multi-value compression method. The expander 401 expands the image data of this compression code. The resolution converter 501 performs resolution conversion on the image data in a predetermined magnification ratio. An RGB→Gray converter 2401 converts the RGB image data into monochrome image data. An isolated point removal unit 2402 detects isolated points in the monochrome multi-value image data using an isolated point detection algorithm. The filter processing unit 502 performs image data emphasis and smoothing processing. The density γ unit 503 adjusts the image density. The halftone processing unit 504 binarizes the image data using a predetermined method. The compressor 402 compresses the data using a universal data compression method such as MHMR/MMR. Note that the expander 401, resolution converter 501, filter processing unit 502, density γ unit 503, halftone processing unit 504, and compressor 402 have identical constitutions to those described above.

By constituting the image format conversion portion 2400 in this manner, color copying image data can be converted into monochrome binary image data and downloaded to the client apparatus 117 or the like. In other words, color image data have a large volume and large load when downloaded to the client apparatus 117 side, and hence it is sometimes desirable to convert the color image data into a monochrome binary image. The third embodiment is capable of responding to this demand.

Next, processing executed by the isolated point removal unit 2402, which is a feature of the image format conversion unit 2400 shown in FIG. 29, will be described. When noise is included in the original image, a visually unpleasant image may be produced. In such a case, isolated point removal is performed appropriately by the processing of the isolated point removal unit 2402. Various methods may be used in an isolated point removal algorithm. Here, a method using a matrix such as that shown in FIG. 30 is employed.

Isolated point determination is performed by the isolated point removal unit 2402 using a 5×5 block such as that shown in FIG. 30. In this example, the target pixel is d22. If all of the pixels other than the target pixel are smaller than a predetermined threshold TH1, the target pixel is replaced by a white pixel (pixel value 0).

By means of this processing, trash images in the downloaded image data can be removed.

Isolated point removal is effective when the image data stored in the HDD 1805 are the data of a read natural image. On the other hand, when the data are electronically created data such as printer RIP data, isolated point removal is not necessary.

Hence, by switching the isolated point removal operating parameters appropriately in accordance with the type of image to be distributed to the client apparatus 117 side, a high quality image can be obtained.

Next, parameter setting by the image format conversion unit 2400 will be described. When each client apparatus 117 requests distribution of the image data stored in the HDD 1805, setting of the attributes of the image to be received (captured) is performed from the client apparatus (PC) 117 side. Parameter values of the image data in the image format conversion unit 2400 are determined and set on the image processing apparatus 1800 side from the attributes of the image data specified by an image capture request signal from the client apparatus 117 and the attributes of the image data stored in the HDD 1805. More specifically, parameter values for each of resolution conversion, filter processing, γ conversion processing, and halftone processing are modified, and image data subjected to image processing based on these parameter values are distributed to the client apparatus 117.

Figure 31:
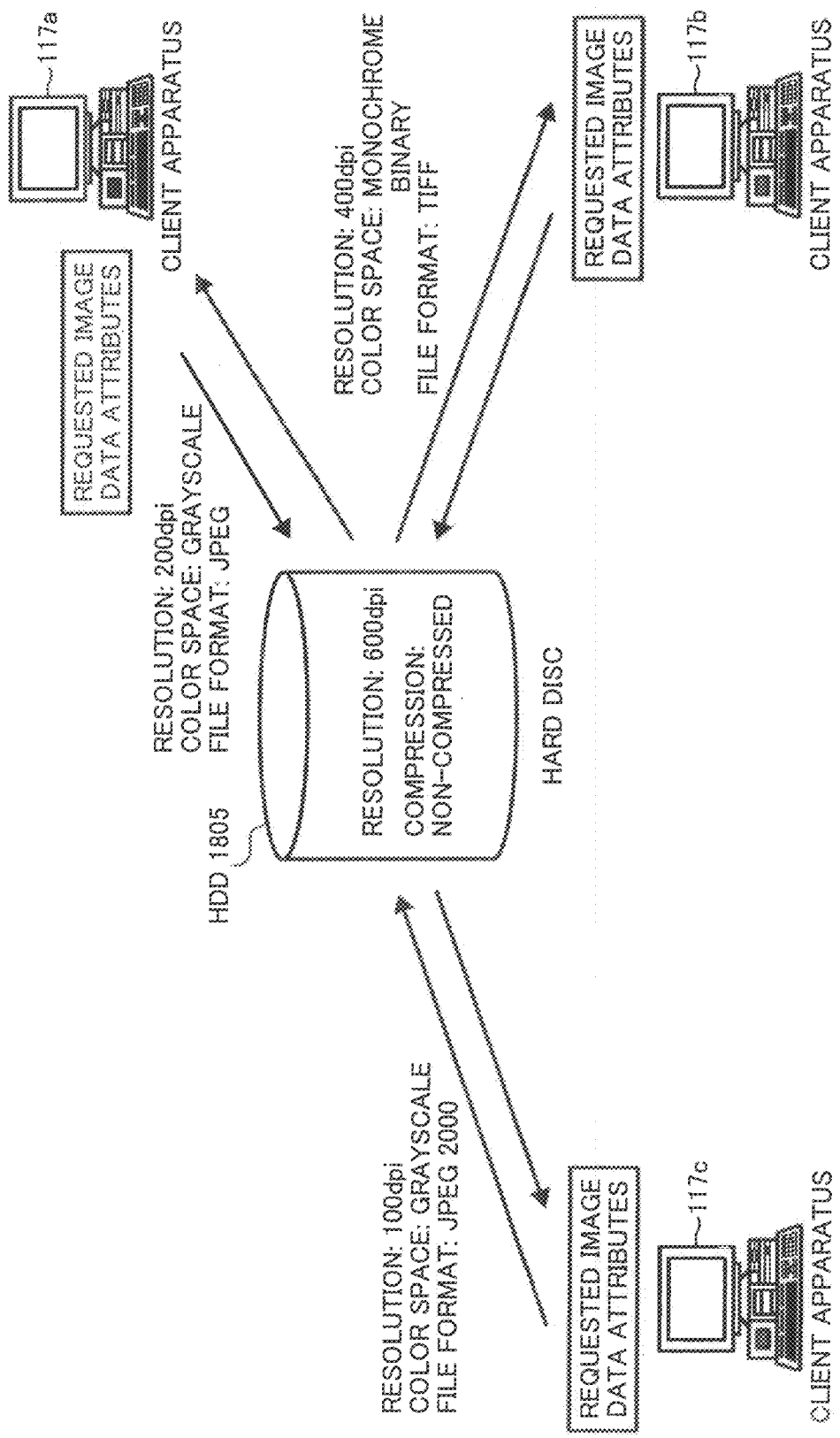
FIG. 31 is a view illustrating processing performed when image data are distributed to external client apparatuses.

As shown in FIG. 31, for example, it is assumed that the image data stored in the HDD 1805 are non-compressed and have a resolution of 600 dpi. A request is received from each client apparatus 117 for image data having various attributes: from the client apparatus 117a a request for reception (capture) of a JPEG image in a grayscale color space and having a resolution of 200 dpi is received; from the client apparatus 117b a request for reception (capture) of a TIFF image in a monochrome binary color space and having a resolution of 400 dpi is received; and from the client apparatus 117c a request for reception (capture) of a JPEG 2000 image in a grayscale color space and having a resolution of 100 dpi is received. The image format conversion unit 2400 receives the respective requests and performs image processing corresponding to the requests of each client apparatus 117. The image data stored in the HDD 1805 are non-compressed, and therefore the expander 401 is bypassed.

Next, in the resolution conversion unit 501, resolution conversion parameter values are determined from the resolution requests of the client apparatuses and the resolution of the image data stored in the HDD 1805. Resolution conversion is implemented to convert the resolution of the image data stored in the HDD 1805 from 600 dpi to 200 dpi for the client apparatus 117a, from 600 dpi to 400 dpi for the client apparatus 117b, and from 600 dpi to 100 dpi for the client apparatus 117c.

Since the client apparatuses 117a, 177c have requested grayscale multi-value image data, processing by the halftone processing unit 504 is not performed on the image data to be distributed to the client apparatuses 117a, 117c. On the other hand, the client apparatus 117b has requested monochrome binary image data, and therefore the halftone processing unit 504 performs binarization processing on the image data to be distributed to the client apparatus 117b.

Next, in the compressor 402, conversion processing is implemented to convert the format of the image data stored in the HDD 1805 to a JPEG file format for the client apparatus 117a, a TIFF file format for the client apparatus 117b, and a JPEG 2000 file format for the client apparatus 117c.

In addition to the image data, the HDD 1805 stores attribute information obtained when the image data input from an operating unit (not shown) of the image processing apparatus 1800 are read. Hence, if the attributes of the image data stored in the HDD 1805 are to be inherited as is when each client apparatus 117 receives (captures) the image data from the image processing apparatus 1800, all or a part of the information relating to the managed data format may be converted automatically by the image format conversion unit 2400 together with the image data without specifying the attributes of the image data to be captured. In so doing, the operation to set the attributes of the image data to be captured on the client apparatuses can be omitted, leading to an improvement in operability.

Figure 32:
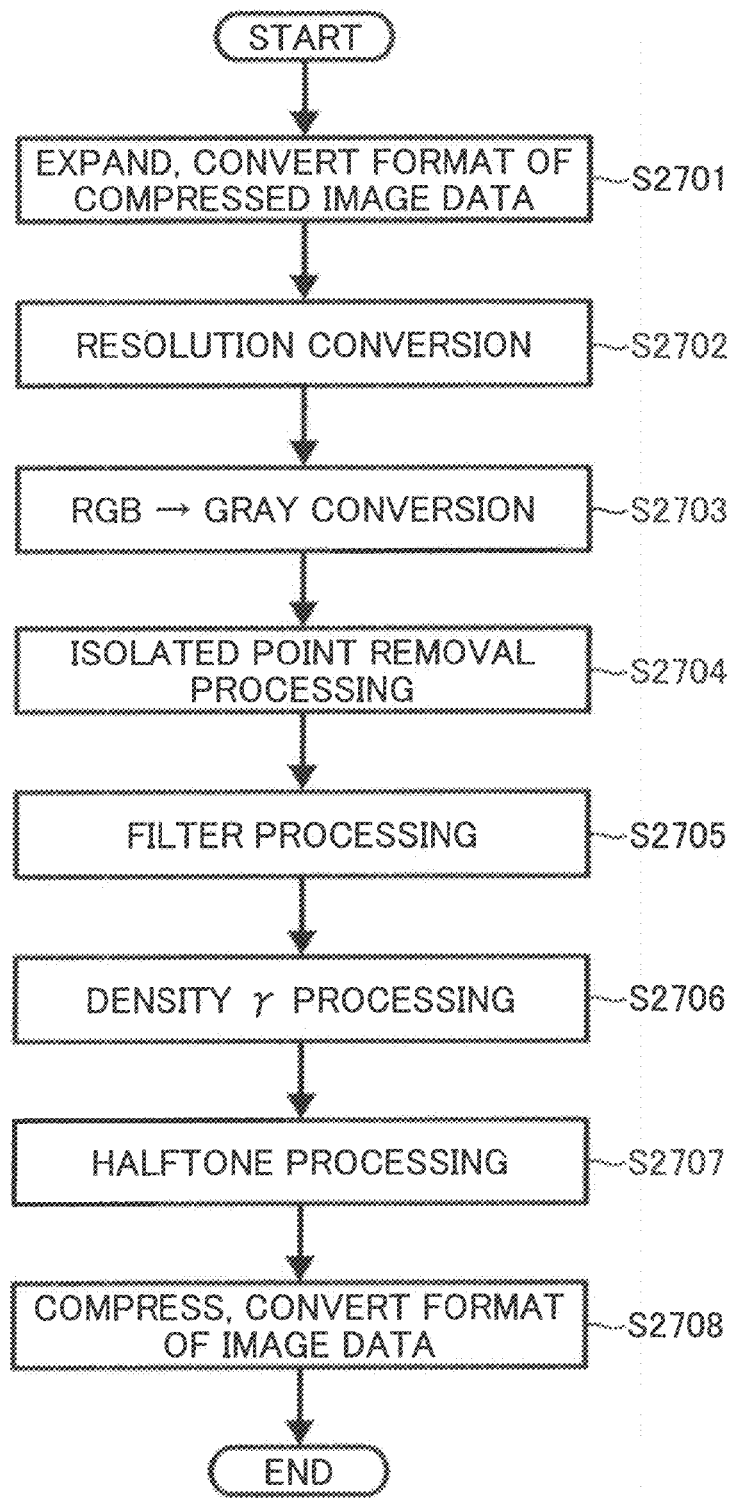
FIG. 32 is a flowchart illustrating an image format conversion processing procedure.

The image data capture processing procedure using the image processing system according to the third embodiment is similar to the first and second embodiments. Here, a case which differs from the first and second embodiments, in which format conversion processing includes RGB-*Gray conversion processing and isolated point removal processing, will be described. FIG. 32 is a flowchart illustrating the format conversion processing procedure performed in this case.

First, copying compressed image data are downloaded from the HDD 1805 and expanded by the expander 401 of the image format conversion unit 2400 into a specific format (step S2701). Next, the expanded image data are subjected to resolution conversion by the resolution converter 501 (step S2702). Next, the resolution-converted image data are subjected to RGB→Gray conversion processing by the RGB-*Gray conversion processing unit 2401 (step S2703). The RGB→Gray-converted image data are then subjected to isolated point removal processing by the isolated point removal unit 2402 (step S2704). Following isolated point removal, the image data are subjected to emphasis filter processing of a desired intensity by the filter processing unit 502 (step S2705). The filter-processed image data are then subjected in succession to density γ conversion processing by the density γ unit 503 (step S2706) and binarization processing through error diffusion or the like by the halftone processing unit 504 (step S2707). Finally, the binary image data are compressed by the compressor 402 using a G3 compression method (step S2708).

By performing the processing described above, appropriate image processing is implemented on the image data stored in the image processing apparatus 1800 easily and efficiently, and thus image data can be distributed to the external client apparatus 117 in the desired format.

As described above, according to the image processing apparatus, image processing method, and image processing program of the present invention, appropriate image processing can be implemented on image data stored in the image processing apparatus easily and efficiently, whereupon the image data can be distributed to an external apparatus.

Note that the image processing method of the present invention may be realized by executing a program prepared in advance on a computer such as a personal computer or workstation. The program is recorded on a computer-readable recording medium such as a hard disk, flexible disk, CD-ROM, MO, or DVD, and executed when read from the recording medium by the computer. The program may also be a transmission medium which can be distributed via a network such as the Internet.

As described above, the image processing apparatus, image processing method, and image processing program according to the present invention are useful in image processing for generating image data by reading an original image, and are particularly suitable for a case in which image data processed in the interior of an apparatus are then used in an external apparatus.

The features of the present invention described above are as follows.

(1) The image data of a read original can be stored in storage means, and hence there is no need to perform re-reading processing on an original that has been read once. Hence, when an original having a reading history needs to be transmitted to an external client apparatus or the like, the image data stored in the storage means can be transmitted. Further, when the image data are to be transmitted to the external client apparatus, the image data can be transmitted following conversion into a format that can be handled by the client apparatus. As a result, external distribution of image data can be performed efficiently.

(2) Image processing can be performed on multi-value or binary image data, and hence the image data can be converted into a color space which conforms to the client apparatus.

(3) The image format converting means is capable of expanding the processing subject image data to convert the format thereof or compressing the processing subject image data for distribution to the client apparatus, and thus, upon distribution to the client apparatus, the processing subject image data conform to the attributes of image data handled by the client apparatus.

(4) The image format converting means is capable of outputting the image data after converting the resolution of the image data such that the image data conform to the attributes of image data handled by the client apparatus.

(5) The image format converting means is capable of outputting the image data after converting the magnification of the image data such that the image data conform to the attributes of image data handled by the client apparatus.

(6) The MTF of the image data can be emphasized.

(7) Multi-value image data can be subjected to binary halftone processing before transfer to an external apparatus, and thus compact image data in a universal format can be transmitted.

(8) The density gradient and so on of the image data can be properly maintained.

(9) Isolated points in the image data can be removed.

(10) When image data are read from the storage means of the image processing apparatus in response to a request from a client apparatus, the parameters of the image format converting means are determined from the attributes of the image data stored in the storage means and the attributes requested by the client apparatus, and therefore the client apparatus can inherit the attributes of the image data stored in the storage means of the image processing apparatus with no modification thereto. Moreover, when the client apparatus inherits the image data attributes as they are, there is no need to modify the attributes (format) of the image in the image format converting means, leading to an improvement in efficiency.

(11) The image processing method can be executed by a computer.

According to the image processing apparatus, image processing method, and image processing program of the present invention, image data in a universal format that can be used in common among various image processing apparatuses are generated from a read original image and transmitted to an external apparatus. As a result, the image data can be made universal and standardized.

Various modifications will become possible for those skilled in the art after receiving the teachings of the present disclosure without departing from the scope thereof.

What is claimed is:

1. An apparatus connectable to external apparatuses, comprising:
    a scanner device configured to read a document and create image data based on the document;
    a memory configured to store a plurality of the image data accessible by any of the external apparatuses, each of the plurality of the image data having been created from the document and having an image format;
    a printing device configured to print the plurality of the image data;
    a request receiving unit configured to receive, from one external apparatus among the external apparatuses, a request for selecting at least one image data among the plurality of the image data which are created by the scanner device and stored in the memory, and for converting an image format of the selected at least one image data to a second image format;
    an image data format converter configured to create converted image data by converting the image format of the selected at least one image data to the second image format according to the request received by the request receiving unit; and
    a sending unit configured to send the converted image data to the external apparatus which sent the request.

2. The apparatus of claim 1, further comprising:
    an image data receiving unit configured to receive image data from one external apparatus among the external apparatuses, the received image data having been created by the external apparatus which sent the image data,
    wherein the memory stores the received image data.

3. The apparatus of claim 2, wherein
    the image format of the created image data based on the document read by the scanner device and an image format of the received image data have different image formats.

4. The apparatus of claim 1, wherein
    the sending unit sends the converted image data to the external apparatus which sent the request via an IP (internet protocol) network.

5. The apparatus of claim 1, wherein
    the second image format is one of JPEG, TIFF, or GIF.

6. The apparatus of claim 1, further comprising:
a color space converter configured to apply a color space conversion to the converted image data to convert from a color space to another different color space.

7. A method to operate an apparatus connectable to external apparatuses comprising:
reading a document and creating image data based on the reading of the document;
storing a plurality of the image data accessible by any of the external apparatuses in a memory of the apparatus, each of the plurality of the image data having been created from the document and having an image format;
receiving, from one external apparatus among the external apparatuses, a request for selecting at least one image data among the plurality of the image data which are created in the creating image data and stored in the memory, and for converting an image format of the selected at least one image data to a second image format;
creating converted image data by converting, by a processor, the image format of the selected at least one image data to the second image format according to the request; and
sending the converted image data to the external apparatus which sent the request.

8. The method of claim 7, further comprising:
receiving image data from an external apparatus, the received image data having been created by the external apparatus which sent the image data; and
storing the received image data.

9. The method of claim 8, wherein
the image format of the created image data based on the document read by the reading and an image format of the received image data have different image formats.

10. The apparatus of claim 7, wherein
the sending sends the converted image data to the external apparatus which sent the request via an IP (internet protocol) network.

11. The apparatus of claim 7, wherein
the second image format is one of JPEG, TIFF, or GIF.

12. The method of claim 7, further comprising:
applying, by the processor, a color space conversion to the converted image data to convert from a color space to another different color space.

13. The method of claim 7, further comprising:
printing the plurality of the image data.

14. A non-transitory computer readable storage medium encoded with instructions, which when executed by a computer causes the computer to execute a method to operate an apparatus connectable to external apparatuses comprising:
reading a document and creating image data based on the reading of the document;
storing a plurality of the image data accessible by any of the external apparatuses in a memory of the apparatus, each of the plurality of the image data having been created from the document and having an image format;
receiving, from one external apparatus among the external apparatuses, a request for selecting at least one image data among the plurality of the image data which are created in the creating image data and stored in the memory, and for converting an image format of the selected at least one image data to a second image format;
creating converted image data by converting, by a processor, the image format of the selected at least one image data to the second image format according to the request; and
sending the converted image data to the external apparatus which sent the request.

15. The non-transitory computer readable storage medium of claim 14, wherein the method further comprises:
receiving image data from an external apparatus, the received image data having been created by the external apparatus which sent the image data; and
storing the received image data.

16. The non-transitory computer readable storage medium of claim 15, wherein
the image format of the created image data based on the document read by the reading and an image format of the received image data have different image formats.

17. The non-transitory computer readable storage medium of claim 14, wherein
the sending sends the converted image data to the external apparatus which sent the request via an IP (internet protocol) network.

18. The non-transitory computer readable storage medium of claim 14, wherein
the second image format is one of JPEG, TIFF, or GIF.

19. The non-transitory computer readable storage medium of claim 14, wherein the method further comprises:
applying, by the processor, a color space conversion to the converted image data to convert from a color space to another different color space.

20. The non-transitory computer readable storage medium of claim 14, wherein the method further comprises:
printing the plurality of the image data.

\* \* \* \* \*